US012170063B2

(12) United States Patent
Chen et al.

(10) Patent No.: US 12,170,063 B2
(45) Date of Patent: Dec. 17, 2024

(54) PIXEL CIRCUIT, DISPLAY APPARATUS, AND DRIVING METHOD

(71) Applicants: Chengdu BOE Optoelectronics Technology Co., Ltd., Sichuan (CN); BOE Technology Group Co., Ltd., Beijing (CN)

(72) Inventors: Yipeng Chen, Beijing (CN); Ling Shi, Beijing (CN); Weifeng Zhou, Beijing (CN)

(73) Assignees: Beijing BOE Technology Development Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 0 days.

(21) Appl. No.: 18/289,108

(22) PCT Filed: Aug. 2, 2022

(86) PCT No.: PCT/CN2022/109707
§ 371 (c)(1),
(2) Date: Oct. 31, 2023

(87) PCT Pub. No.: WO2023/011474
PCT Pub. Date: Feb. 9, 2023

(65) Prior Publication Data

US 2024/0221646 A1 Jul. 4, 2024

(30) Foreign Application Priority Data

Aug. 5, 2021 (CN) ........................ 202110898670.X

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/0861;
(Continued)

(56) References Cited

U.S. PATENT DOCUMENTS 10,657,894 B2 5/2020 Peng et al.
11,004,385 B1 * 5/2021 Li ........................ G09G 3/3233
(Continued)

FOREIGN PATENT DOCUMENTS

CN 107154239 A 9/2017
CN 107610652 A 1/2018
(Continued)

OTHER PUBLICATIONS

Oct. 26, 2022—(WO) International Search Report and Written Opinion (and English translations)—App PCT/CN2022/109707.

*Primary Examiner* — Michael Pervan
(74) *Attorney, Agent, or Firm* — Banner & Witcoff, Ltd.

(57) ABSTRACT

A pixel circuit, a display apparatus, and a driving method. The pixel circuit include: a driving circuit, a data writing circuit, a compensation circuit, a light emission control circuit, a first reset circuit, a second reset circuit, and a light-emitting element. The data writing circuit is for writing a data signal into the first terminal of the driving circuit based on a writing control signal; the first reset circuit is for applying a first reset voltage to the control terminal of the driving circuit based on a first reset control signal; and the second reset circuit is for applying a second reset voltage to a first electrode of the light-emitting element based on a second reset control signal. The writing control signal and the second reset control signal are synchronized in each write frame, and the writing control signal remains at an invalid level in each skip frame.

15 Claims, 11 Drawing Sheets

(52) U.S. Cl.
CPC ............... *G09G 2300/0861* (2013.01); *G09G 2320/0233* (2013.01); *G09G 2320/0247* (2013.01); *G09G 2330/021* (2013.01)

(58) Field of Classification Search
CPC ... G09G 2320/0233; G09G 2320/0247; G09G 2330/021
See application file for complete search history.

(56) References Cited

U.S. PATENT DOCUMENTS

| | | | | |
|---|---|---|---|---|
| 11,030,959 | B2 | 6/2021 | Gao et al. | |
| 11,069,295 | B2 | 7/2021 | Nam et al. | |
| 11,250,790 | B2 | 2/2022 | Xiong et al. | |
| 11,282,461 | B2 * | 3/2022 | Li | G09G 3/3233 |
| 11,348,524 | B2 * | 5/2022 | Gao | G09G 3/3233 |
| 11,373,582 | B2 | 6/2022 | Lee et al. | |
| 11,393,396 | B2 | 7/2022 | Yang et al. | |
| 11,469,291 | B2 * | 10/2022 | Diao | H10K 59/1216 |
| 11,682,349 | B2 * | 6/2023 | Gao | G09G 3/3233 345/212 |
| 11,854,473 | B2 | 12/2023 | Lai et al. | |
| 11,922,879 | B2 * | 3/2024 | Gao | H10K 59/121 |
| 2020/0111418 | A1 * | 4/2020 | Nam | G09G 3/3233 |
| 2021/0104196 | A1 | 4/2021 | Yuan | |
| 2021/0193780 | A1 * | 6/2021 | Diao | H01L 29/78633 |
| 2021/0233988 | A1 * | 7/2021 | Wei | H10K 59/131 |
| 2021/0280132 | A1 * | 9/2021 | Gao | G09G 3/3233 |
| 2021/0287614 | A1 * | 9/2021 | Xiong | G09G 3/3233 |
| 2021/0407419 | A1 | 12/2021 | Li et al. | |
| 2022/0157238 | A1 * | 5/2022 | Wang | G09G 3/3233 |
| 2022/0262310 | A1 * | 8/2022 | Gao | G09G 3/3233 |
| 2023/0309341 | A1 * | 9/2023 | Gao | H10K 59/121 |
| 2024/0169917 | A1 * | 5/2024 | Gao | H10K 59/121 |
| 2024/0237446 | A1 * | 7/2024 | Diao | H01L 29/78609 |

FOREIGN PATENT DOCUMENTS

| | | | |
|---|---|---|---|
| CN | 107945743 | A | 4/2018 |
| CN | 109064978 | A | 12/2018 |
| CN | 109599062 | A | 4/2019 |
| CN | 110176213 | A | 8/2019 |
| CN | 110660360 | A | 1/2020 |
| CN | 111009218 | A | 4/2020 |
| CN | 111710299 | A | 9/2020 |
| CN | 111710300 | A | 9/2020 |
| CN | 111724745 | A | 9/2020 |
| CN | 112116890 | A | 12/2020 |
| CN | 213277408 | U | 5/2021 |
| CN | 113012643 | A | 6/2021 |
| CN | 113838420 | A | 12/2021 |

* cited by examiner

PIXEL CIRCUIT, DISPLAY APPARATUS, AND DRIVING METHOD

The application is a U.S. National Phase Entry of International Application No. PCT/CN2022/109707 filed Aug. 2, 2022, designating the United States of America and claiming priority to Chinese Patent Application No. 202110898670.X filed Aug. 5, 2021. The present application claims priority to and the benefit of the above-identified applications and the above-identified applications are incorporated by reference herein in their entirety.

TECHNICAL FIELD

The present disclosure relates to a field of display technologies, and more particularly, to a pixel circuit, a display apparatus and a driving method for the pixel circuit.

BACKGROUND

The Low Temperature Polycrystalline Oxide (LTPO) display technology, combining two types of thin film transistors, namely, Low Temperature Polycrystalline Silicon (LTPS) and oxide semiconductor (e.g., Indium Gallium Zinc Oxide (IGZO)), makes a display panel have characteristics of strong driving capability and low power consumption at a same time, and applicable to high-frequency display and low-frequency display at a same time, so it has become an increasingly popular technology in display panels.

On the other hand, in terms of display effect, it is desirable that a display picture of the display panel will be as stable as possible.

Therefore, a pixel circuit based on the LTPO technology is needed, and the pixel circuit is also capable of stabilizing a display picture of a display panel that includes a plurality of pixel circuits.

SUMMARY

According to one aspect of the present disclosure, there is provided a pixel circuit, including: a driving circuit, a data writing circuit, a compensation circuit, a light emission control circuit, a first reset circuit, a second reset circuit, and a light-emitting element; wherein: the driving circuit comprises a control terminal, a first terminal and a second terminal, which are respectively connected with a first node, a second node, and a third node, and are used for controlling a driving current flowing through the first terminal and the second terminal for driving the light-emitting element to emit light; the data writing circuit is used for writing a data signal to the first terminal of the driving circuit under control of a writing control signal; the compensation circuit is used for electrically connecting the control terminal and the second terminal of the driving circuit under control of a compensation control signal, and storing a voltage of the control terminal of the driving circuit; the light emission control circuit is used for causing the driving current to flow through the light-emitting element under control of a light emission control signal; the first reset circuit is used for applying a first reset voltage to the control terminal of the driving circuit under control of a first reset control signal, the second reset circuit is used for applying a second reset voltage to a first electrode of the light-emitting element under control of a second reset control signal; in a case where each display cycle sequentially comprises one write frame and at least one skip frame, within the write frame, the writing control signal and the second reset control signal are synchronized, and within each skip frame, the writing control signal is kept as an invalid level, and the second reset control signal of the skip frame has same characteristics as the second reset control signal of the write frame.

According to another aspect of the present disclosure, there is provided a display apparatus, including: a plurality of pixel units arranged in an array, wherein, each of the pixel units includes the pixel circuit as described above.

According to still another aspect of the present disclosure, there is further provided a driving method for the above-described pixel circuit, including: in a case where each display cycle sequentially comprises one write frame and at least one skip frame, within the write frame, synchronizing the writing control signal and the second reset control signal, including in the write frame: a reset stage, a data write and compensation stage, and a light emission stage; and within each skip frame, keeping the writing control signal as an invalid level, making the second reset control signal of the skip frame have same characteristics as the second reset control signal of the write frame, and including in the skip frame: a light emission reset stage corresponding to the data write and compensation stage of the write frame and a light emission stage corresponding to the light emission stage within the write frame.

According to the embodiment of the present disclosure, the light emission control signal includes a first light emission control signal and a second light emission control signal, and the driving method further includes: within the write frame, synchronizing the first light emission control signal and the second light emission control signal; and within each skip frame, keeping the first light emission control signal as a valid level, and making the second light emission control signal of the skip frame have same characteristics as the second light emission control signal of the write frame.

DETAILED DESCRIPTION

In order to make objectives, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those ordinarily skilled in the art can acquire other embodiment(s), without any inventive labor, which should be within the scope of the present disclosure.

Unless otherwise defined, the technical or scientific terms used in the present disclosure shall have the usual meanings understood by those ordinarily skilled in the art to which the present disclosure belongs. The terms “first”, “second” and similar words used in the present disclosure do not indicate any order, quantity or importance, but are only used to distinguish different components. Similarly, words such as “one”, “a/an” or “the” or the like do not denote quantitative limitation, but rather indicate that there is at least one. Words such as “include” or “comprise” and the like denote that elements or objects appearing before the words of “include” or “comprise” cover the elements or the objects enumerated after the words of “include” or “comprise” or equivalents thereof, not exclusive of other elements or objects. Words such as “connected” or “connecting” and the like are not limited to physical or mechanical connections, but may include electrical connection, either direct or indirect. Words such as “up”, “down”, “left”, “right” and the like are only used for expressing relative positional relationship, when the absolute position of the described object is changed, the relative positional relationship may also be correspondingly changed.

Figure 1A:
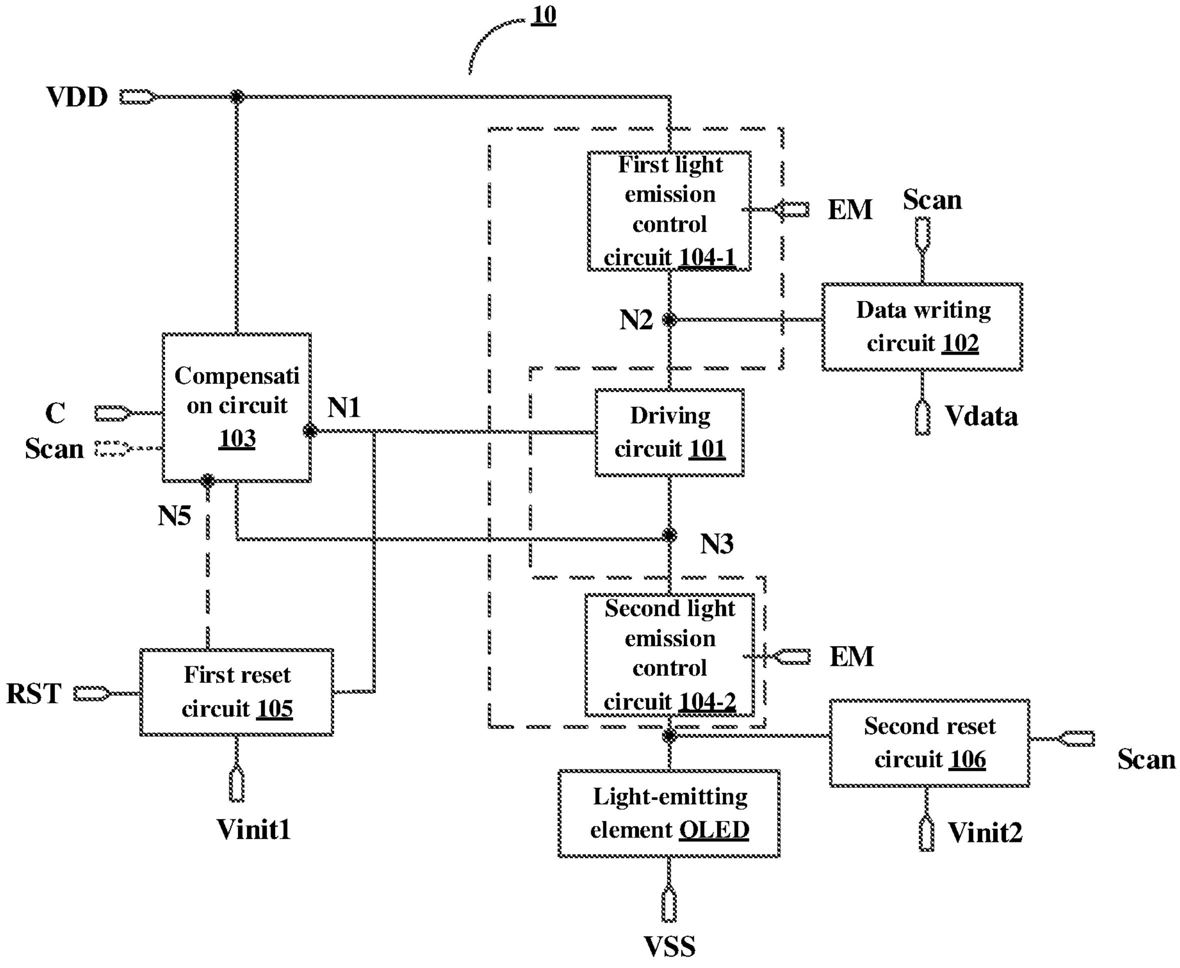
FIG. 1A shows a structural block diagram of a pixel circuit based on the LTPO technology according to an embodiment of the present disclosure.

FIG. 1A shows a structural block diagram of a pixel circuit based on the LTPO technology according to an embodiment of the present disclosure.

As shown in FIG. 1A, a pixel circuit 10 includes: a driving circuit 101, a data writing circuit 102, a compensation circuit 103, light emission control circuits 104 (104-1 and 104-2), a first reset circuit 105, and a second reset circuit 106.

The driving circuit includes a control terminal, a first terminal, and a second terminal, and is used for controlling a driving current flowing through the first terminal and the second terminal for driving a light-emitting element to emit light.

The data writing circuit is used for writing a data signal to the first terminal of the driving circuit under control of a scan signal (Scan).

Optionally, the scan signal may be generated by a GOA circuit, and shifted in rows to be applied to a plurality of the pixel circuits, to control the pixel circuits for data writing.

In addition, as will be described below, with respect to each pixel circuit, signals controlling respective circuits therein need to meet specific timing relationships with the scan signal, so these signals are also shifted in rows.

The compensation circuit is used for electrically connecting the control terminal and second terminal of the driving circuit under control of a compensation control signal, or under control of the compensation control signal and the scan signal, and storing a voltage at the control terminal of the driving circuit.

The light emission control circuit is used for causing the driving current to flow through the light-emitting element under control of a light emission control signal.

Optionally, the light emission control circuit may include a first light emission control circuit and a second light emission control circuit, and correspondingly, the light emission control signal may include a first light emission control signal and a second light emission control signal. The first light emission control circuit is used for applying a first power voltage (VDD) of a first power terminal to the first terminal of the driving circuit under control of the first light emission control signal. The second light emission control circuit is used for applying the driving current from the second terminal of the driving circuit to a first electrode of the light-emitting element under control of the second light emission control signal. The first light emission control signal and the second light emission control signal are a same signal (EM).

The first reset circuit is used for applying a first reset voltage to the control terminal of the driving circuit under control of a first reset control signal.

The second reset circuit is used for applying a second reset voltage to the first electrode of the light-emitting element under control of a second reset control signal.

Optionally, the second reset control signal is a scan signal or synchronized with the scan signal, that is, resets a voltage of the first electrode of the light-emitting element while writing data, so that charges possibly existing on a parasitic capacitor of the light-emitting element may be released to ensure normal light emission. In other implementations, the second reset control signal may also be synchronized with the first reset control signal, as long as the voltage of the first electrode of the light-emitting element is reset before the light emission control signal for the frame is valid.

A second electrode of the light-emitting element is connected with a second power terminal to receive a second power voltage (VSS).

Figure 1B:
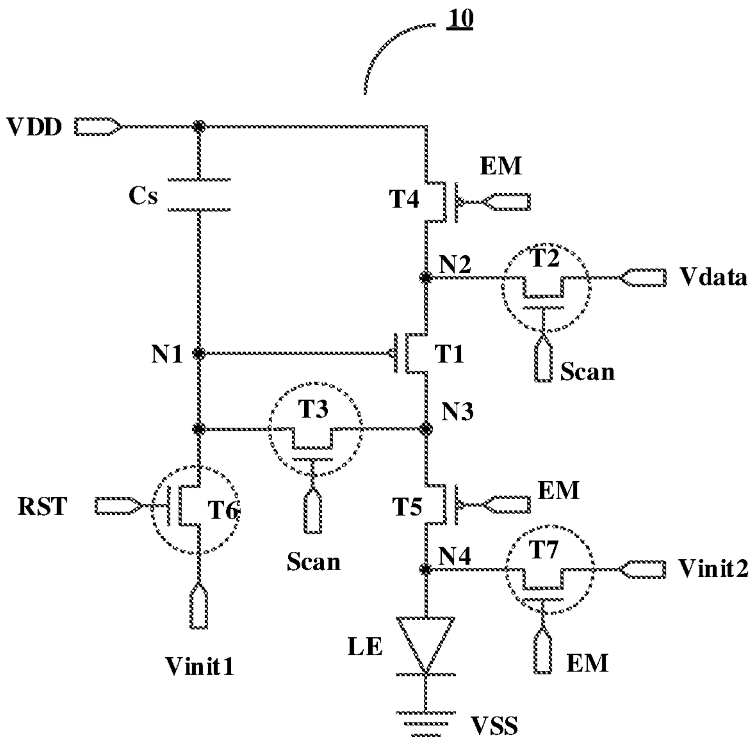
FIG. 1B to FIG. 1C show a circuit diagram and a corresponding timing diagram of an example circuit structure of the pixel circuit.
Figure 1C:
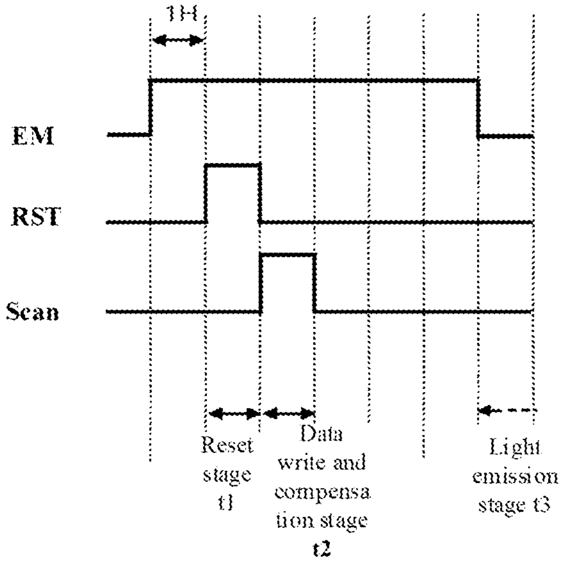

FIG. 1B to FIG. 1C show a circuit diagram and a corresponding timing diagram of an example circuit structure of the pixel circuit.

It should be noted that the respective example pixel circuits shown herein provide example description for circuit structures in respective circuit modules in FIG. 1A, but this is not limited to that each circuit module must adopt a completely consistent structure as described in FIG. 1B. For example, the driving circuit adopts a circuit structure as shown in FIG. 1B, and the data writing circuit may adopt a circuit structure different from that shown in FIG. 1B, for example, may adopt a circuit structure including more transistors and so on, as long as the data voltage may be applied to the second node (N2) under control of the scan signal. The understanding also applies to other example circuit structures according to the present disclosure.

As shown in FIG. 1B, the driving circuit includes a first transistor (T1). A gate electrode of the first transistor serves as the control terminal of the driving circuit and is connected with a first node (N1), a first electrode of the first transistor serves as the first terminal of the driving circuit and is connected with a second node (N2), and a second electrode of the first transistor serves as the second terminal of the driving circuit and is connected with a third node (N3).

The data writing circuit includes a second transistor (T2). A gate electrode of the second transistor is used for receiving the scan signal (Scan), a first electrode of the second transistor is used for receiving the data signal, and a second electrode of the second transistor is connected with the second node (N2).

The compensation circuit includes a third transistor (T3) and a storage capacitor (Cs). A gate electrode of the third transistor (T3) is used for receiving the compensation control signal (C), a first electrode of the third transistor is connected with the third node, a second electrode of the third transistor is connected with a first electrode of the storage capacitor and the first node, and a second electrode of the storage capacitor is connected with the first power terminal for receiving the first power voltage. The compensation control signal (C) is the scan signal (Scan) (which will be taken an example hereinafter) or synchronized with the scan signal (Scan).

The first light emission control circuit includes a fourth transistor (T4). A gate electrode of the fourth transistor is used for receiving a light emission control signal (EM), a first electrode of the fourth transistor is connected with the first power terminal for receiving the first power voltage, and a second electrode of the fourth transistor is connected with the second node (N2).

The second light emission control circuit includes a fifth transistor (T5). A gate electrode of the fifth transistor is used for receiving a light emission control signal (EM), a first electrode of the fifth transistor is connected with the third node (N3), and a second electrode of the fifth transistor is connected with the first electrode (serving as the fourth node) of the light-emitting element.

The first reset circuit includes a sixth transistor (T6). A gate electrode of the sixth transistor is used for receiving the first reset control signal (RST), a first electrode of the sixth transistor is connected with the first node, and a second electrode of the sixth transistor is used for receiving the first reset voltage.

The second reset circuit includes a seventh transistor (T7). A gate electrode of the seventh transistor is used for receiving the second reset control signal, a first electrode of the seventh transistor is connected with the first electrode of the light-emitting element, and a second electrode of the seventh transistor is used for receiving the second reset voltage. The second reset control signal may be the light emission control signal (which will be taken as an example hereinafter) or synchronized with the light emission control signal.

When the light emission control signal is of an invalid level, the seventh transistor is caused to be turned on to realize reset, and when the light emission control signal is of a valid level, it causes the driving current to flow through the light-emitting element to emit light.

An important factor in stabilizing brightness of the light-emitting element is the stability of a gate-source voltage of a driving transistor (the first transistor), so it is necessary to avoid leakage at respective nodes as far as possible. Transistors outside the driving current flowing path may be selected as transistors with better leakage current characteristics, i.e., transistors with leakage current characteristics superior than those on the driving current flowing path. At present, in the display field, adopting LTPO TFT has lower driving power than adopting LTPS TFT. For example, an LTPS transistor has a larger leakage current, but fast driving speed and high ON-state current, and an LTPO transistor may refer to an oxide transistor, which has a smaller leakage current. With respect to the pixel circuit shown in FIG. 1B, transistors outside the driving current flowing path (i.e., transistors T2, T3, T6, and T7) may be set as oxide transistors, while transistors on the driving current flowing path (T1, T4, T5) adopt LTPS to ensure fast driving speed.

In addition, in the pixel circuit shown in FIG. 1B, polarity of the transistors in the first and second light emission control circuits as well as the driving transistors (T1, T4, T5) is shown to be opposite to polarity of the transistors (T2, T3, T6, T7) in the data writing circuit and the first and second reset circuits. But adaptive changes may be made according to actual situations.

Hereinafter, a driving manner and an operation process of the pixel circuit shown in FIG. 1B will be described in conjunction with FIG. 1C.

As shown in FIG. 1C, a reset stage, a data write and compensation stage, and a light emission stage are included.

In the reset stage, the first reset control signal is set as a valid level, while the scan signal and the light emission control signal are set as an invalid level.

In this way, since the first reset control signal is a valid level and the light emission control signal is an invalid level, the sixth transistor (T6) is turned on, the seventh transistor (T7, which has a polarity opposite to the polarity of the transistor in the light emission control circuit, and thus is turned on when the EM signal is invalid), and the remaining transistors are all turned off, to supply the first reset voltage to the first node (N1), and supply the second reset voltage to the first electrode of the light-emitting element (the fourth node), at this time, the voltage of the first node is Vint1, the voltage of the fourth node is Vint2, and the voltages of the second node and the third node float after the end of the previous stage.

In the data write and compensation stage, the scan signal is set as a valid level, while the first reset control signal and the light emission control signal are set as an invalid level.

In this way, the first transistor T1, the second transistor T2, the third transistor T3, and the seventh transistor T7 are turned on, the remaining transistors are turned off, and the first transistor T1 forms a diode connection. The data signal Data sequentially passes through the second transistor T2, the first transistor T1, and the third transistor T3 to charge the first node N1, and charging is completed until the voltage of the first node N1 is Vdata+Vth. The voltage of the second node N2 is Vdata, and the voltage of the third node N3 is Vdata+Vth, so as to complete extraction of the threshold voltage Vth of the first transistor T1 and writing of the data voltage Vdata. At this time, the voltage on the storage capacitor is Vdata+Vth−VDD, that is, the threshold voltage Vth of the first transistor T1 is stored in the storage capacitor.

In addition, in the data write and compensation stage, as the seventh transistor T7 in the second reset circuit is still on, the voltage of the first electrode of the light-emitting element (the fourth node) is still being reset.

In the light emission stage, the light emission control signal is set as a valid level; while the scan signal and the first reset control signal are set as an invalid level.

In this way, the first transistor T1, the fourth transistor T4, and the fifth transistor T5 are turned on, while the remaining transistors are turned off, and the current flows from VDD to VSS. At this time, the voltage of the first node N1 is still Vdata+Vth due to the storage capacitor, the voltage of the second node is VDD, and the voltage of the third node N3 is the voltage of the first electrode of the light-emitting element. A gate-source voltage difference of the first transistor T1 is: Vgs=N1 voltage−N2 voltage=Vdata+Vth−VDD, and the driving current flowing through the light-emitting element is $I=K(Vgs-Vth)^2=K(Vdata+Vth-VDD-Vth)^2=K(Vdata-VDD)^2$, where, K is an intrinsic factor of the transistor. From this, it may be seen that the driving current I flowing through the light-emitting element is independent of the threshold voltage Vth of the first transistor T1, and the pixel circuit implements compensation for the threshold voltage Vth of the first transistor T1.

The light emission control signal may change from a valid level (which is a low level in the diagram) to an invalid level (which is a high level in the diagram) before the first reset control signal becomes valid or at the same time when the first reset control signal becomes valid, and then changes to a valid level again after the end or at the end of the data write and compensation stage (the scan signal becomes an invalid level again), for light emission based on the newly written data of the current display frame. For example, in FIG. 1C, it is shown that the light emission control signal changes from a valid level to an invalid level one clock cycle before the first reset control signal becomes valid, and changes to a valid level again three clock cycles after the end of the data writing stage. A reset operation is always performed on the voltage of the first electrode of the light-emitting element during the period when the light emission control signal is an invalid level.

Of course, the light emission control signal may also be set in other manners, as long as it is kept as an invalid level during the reset stage and the data write and compensation stage.

In the respective pixel circuits shown in the embodiments of the present disclosure, the light-emitting element may be an Organic Light Emitting Diode (OLED), whose first electrode is an anode of the OLED and whose second electrode is a cathode of the OLED.

In the present disclosure, the first power voltage VDD may be a direct-current voltage greater than 0, for example, 5 V, 4.6 V, etc. The second power voltage VSS may be a direct-current voltage less than or equal to 0, for example, 0 V, −2 V, etc. The first reset voltage and the second reset voltage may be the same, for example, both are the second power voltage VSS, and of course, the two may also take other different values less than or equal to 0.

The threshold voltage Vth of the driving transistor (the first transistor T1) in the driving circuit may be greater than or equal to −5 V but less than or equal to −2 V; preferably, Vth may be greater than or equal to −4 V but less than or equal to −2.5 V; for example, Vth may be −4 V, −3.5 V, −3 V, or −2.5 V, but is not limited thereto.

In the pixel circuit described with reference to FIG. 1B to FIG. 1C, use of oxide transistors may reduce leakage in the circuit, and due to use of the light emission control signal to control reset of the voltage on the first electrode of the light-emitting element, reset time of the second reset voltage on the light-emitting element is greatly extended, which ensures complete release of the voltage on the light-emitting element and saves signal overhead. In addition, when the second transistor of the data writing circuit and the third transistor of the compensation circuit are both oxide transistors of a same type, they may be driven by a same signal (i.e., the scan signal), so there is no need for two separate signals, which may also save signal overhead and facilitate design of narrow borders and reduction of overall power consumption of signal generation circuits (e.g., GOA circuits) that generate the respective signals.

Figure 1D:
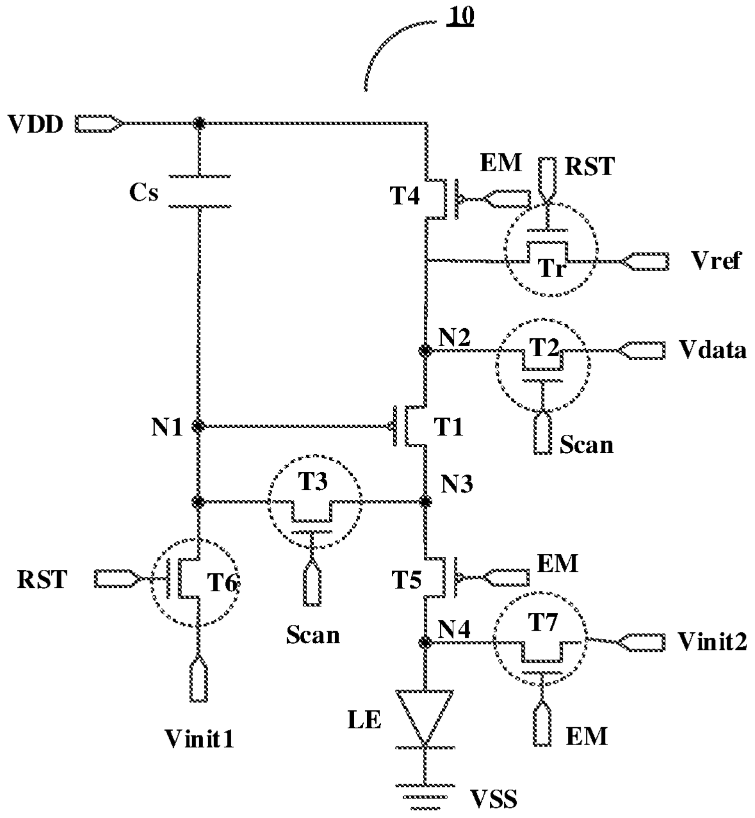
FIG. 1D to FIG. 1E show a circuit diagram and a corresponding timing diagram of another example circuit structure of the pixel circuit.
Figure 1E:
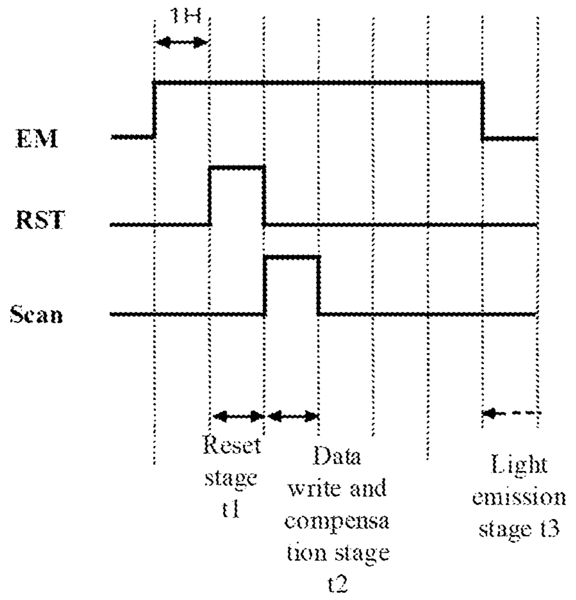

FIG. 1D to FIG. 1E show a circuit diagram and a corresponding timing diagram of another example circuit structure of the pixel circuit.

Since such an example circuit structure is mostly the same as the example structure described with reference to FIG. 1B to FIG. 1C, only different portions will be described below.

As shown in FIG. 1D, a third reset circuit is further added on the basis of the example structure described with reference to FIG. 1B. The third reset circuit is used for applying a third reset voltage to the first terminal (i.e., the second node) of the driving transistor under control of the third reset control signal. The third reset control signal may be the first reset control signal or synchronized with the first reset control signal.

In FIG. 1D, the third reset circuit includes a reset transistor (Tr), a gate electrode of the reset transistor is used for receiving the third reset control signal, a first electrode of the sixth transistor is connected with the second node, and a second electrode of the sixth transistor is used for receiving the third reset voltage. The third reset voltage is a direct-current voltage, for example, 5 V, or the same as the first power voltage, to reduce the number of lines.

Similarly, the third reset transistor may also be selected as an oxide transistor.

The timing diagram shown in FIG. 1E is the same as the timing diagram in FIG. 1C. The two only differ in that in the reset stage, the reset transistor (Tr) is turned on under control of the first reset control signal (RST), to apply the third reset voltage to the second node (N2), and the first node is also pulled down to the first reset voltage, which may not only reduces the leakage current, but may also reset a gate-source voltage of the first transistor (T1), which is favorable for accelerating a recovery speed of the first transistor, and thus, will mitigate the hysteresis at the first transistor, improve hysteresis recovery speed, help improve stability of the first transistor, further keep brightness of the display picture when switching between high-frequency display and low-frequency display (e.g., switching from video to displaying still images), and reduce risks of jitter.

One application of adopting transistors based on the LTPO technology is reducing driving power consumption during low-frequency display.

As described above, the leakage current of the LTPS transistor is relatively large; in order to keep voltages on the capacitors in the respective pixel circuits of the display panel, a high data refresh frequency (e.g., 60 Hz, that is, 60 refreshes within 1 s) is required even when displaying, for example, still images, to constantly charge the capacitors, resulting in high power consumption. The LTPO transistor is an oxide transistor with a small leakage current, which allows voltages on capacitors to be kept for a longer time, so a transistor of a portion in the circuit that is prone to leakage (e.g., a transistor whose first electrode or second electrode is directly connected with one electrode of the capacitor or the gate electrode of the driving transistor) may adopt an oxide transistor (an IGZO transistor), which, thus, may perform data refresh at a very low frequency (e.g., 1 Hz, that is, one refresh within 1 s) when displaying still images, making the pixel circuits applicable to low-frequency driving and reducing power consumption of the display panel. Therefore, the example pixel circuits introduced by the present disclosure all adopt LTPO transistors.

Some contents to be displayed on the display panel (e.g., videos) may require a high data refresh frequency, for example, 60 Hz, that is, 60 refreshes per second; data writing of all rows of pixels is completed between every two refreshes (1 s/60), and a duration between starting data writing of a first row of pixel circuits and completing data writing of a last row of pixel circuits is corresponded to a duration of a display frame, so 1 s includes 60 display frames in such a case.

However, other contents to be displayed may not require a high data refresh frequency, for example, still images, which only require a data refresh frequency of 1 Hz, that is, only one update of displayed data per second. Since a clock signal is usually fixed, a duration of the display frame remains unchanged relative to different data refresh frequencies. In such case, data writing of all rows of pixels is completed in a first display frame (referred to as the write frame) of the display cycle (e.g., 1 s), and in subsequent display frames (referred to as keep frames or skip frames), each pixel circuit still controls the light-emitting element to emit light based on the voltage on storage capacitors thereof, and based on the light emission control signal.

Hereinafter, more detail of operation processes of pixel circuits, in high-frequency display and low-frequency display, especially in low-frequency display, will be further introduced.

Figure 2A:
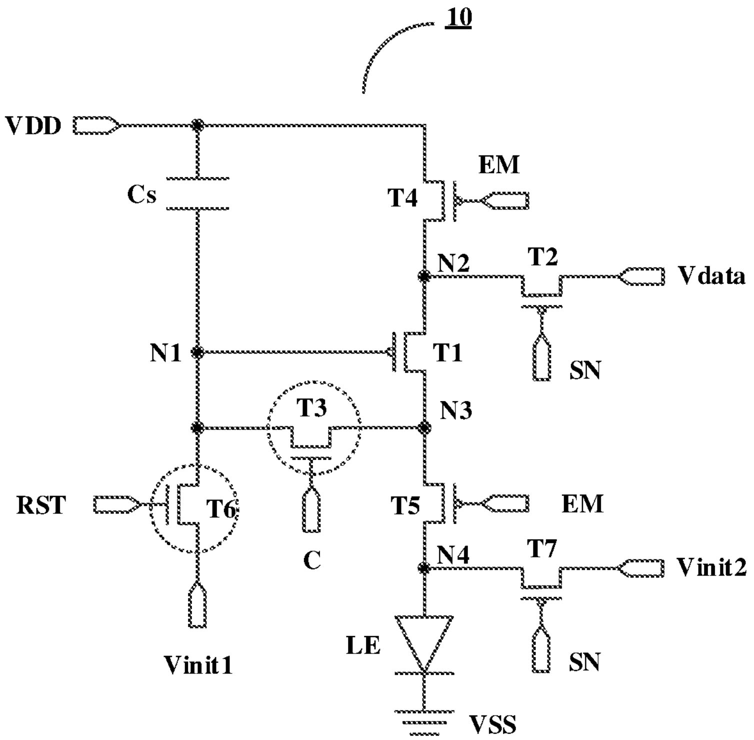
FIG. 2A to FIG. 2B show a circuit diagram and a corresponding timing diagram of a first example circuit structure of the pixel circuit, in conjunction with low-frequency display, according to the embodiment of the present disclosure.
Figure 2B:
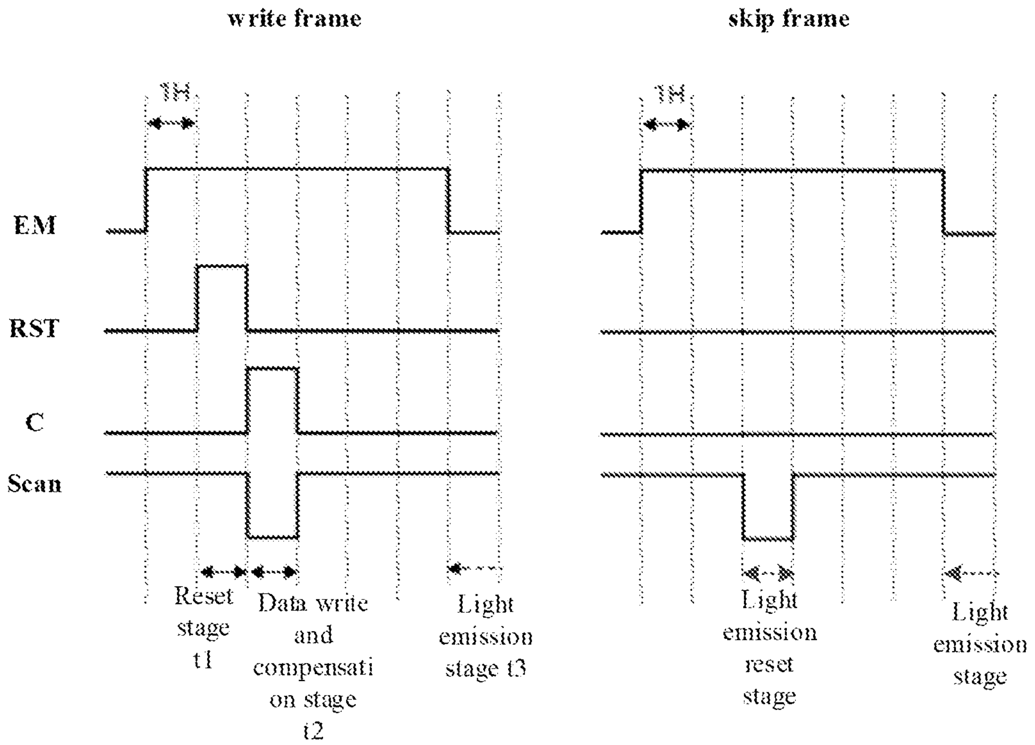

FIG. 2A to FIG. 2B show a circuit diagram and a corresponding timing diagram of a first example circuit structure of the pixel circuit, in conjunction with low-frequency display.

The example circuit structure shown in FIG. 2A is the same as the example circuit structure shown in FIG. 1B, and differs in that transistor types and/or respective control signals applied to the data writing circuit, the compensation circuit, and the second reset circuit are different from those shown in FIG. 1B.

As shown in FIG. 2A, as compared with the circuit shown in FIG. 1B, a smaller number of oxide transistors are adopted, that is, only the third transistor and the sixth transistor are oxide transistors, resulting in faster speed.

The data writing circuit includes a second transistor (T2). A gate electrode of the second transistor is used for receiving the scan signal, a first electrode of the second transistor is used for receiving the data signal, and a second electrode of the second transistor is connected with the second node (N2). The second transistor is a low-temperature polycrystalline silicon transistor.

The compensation circuit includes a third transistor (T3) and a storage capacitor (Cs). A gate electrode of the third transistor (T3) is used for receiving the compensation control signal (which is no longer a scan signal), a first electrode of the third transistor is connected with the third node, a second electrode of the third transistor is connected with a first electrode of the storage capacitor and the first node, and a second electrode of the storage capacitor is connected with the first power terminal for receiving the first power voltage. Due to connection between the second electrode of the third transistor (T3) and the first electrode of the storage capacitor, the third transistor is an oxide transistor.

The second reset circuit includes a seventh transistor (T7). A gate electrode of the seventh transistor is used for receiving the second reset control signal (which is the scan signal instead of the light emission control signal), a first electrode of the seventh transistor is connected with a first electrode of the light-emitting element, and a second electrode of the seventh transistor is used for receiving the second reset voltage. The seventh transistor is a low-temperature polycrystalline silicon transistor.

Hereinafter, a driving manner and an operation process of the pixel circuit shown in FIG. 2A will be described in conjunction with FIG. 2B.

It should be noted that the respective timing diagrams as described in the present disclosure are for a case where a high data refresh frequency is not required (also referred to as low-frequency display hereinafter), while in a case where a high data refresh frequency is required (e.g., 60 display frames within 1 s), driving timing of each display frame is the same as timing of the write frame as described with reference to FIG. 2B, FIG. 3B, FIG. 4B, FIG. 6B, FIG. 7B, or FIG. 8B, and thus will not be described.

As shown in FIG. 2B, with respect to the write frame, a reset stage (t1), a data write and compensation stage (t2), and a light emission stage (t3) are included.

In the reset stage, the first reset control signal is set as a valid level, while the scan signal, the compensation control signal, and the light emission control signal are set as an invalid level.

In this way, since the first reset control signal is of a valid level, the sixth transistor (T6) is turned on, and the remaining transistors are all turned off, to supply the first reset voltage to the first node (N1). At this time, the voltage of the first node is Vint1, and voltages of the second node, the third node, and the first electrode (the fourth node) of the light-emitting element float after the end of the previous stage.

In the data write and compensation stage, the first reset control signal and the light emission control signal are set as an invalid level, while the scan signal and the compensation control signal are set as a valid level.

In this way, the first transistor T1, the second transistor T2, the third transistor T3 and the seventh transistor T7 are turned on, and the remaining transistors are turned off. The first transistor T1 forms a diode connection. The data signal Data sequentially passes through the second transistor T2, the first transistor T1, and the third transistor T3 to charge the first node N1, and charging is completed until the voltage of the first node N1 is Vdata+Vth. The voltage of the second node N2 is Vdata, and the voltage of the third node N3 is Vdata+Vth, so as to complete extraction of the threshold voltage Vth of the first transistor T1 and writing of the data voltage Vdata. At this time, the voltage on the storage capacitor is Vdata+Vth−VDD, that is, the threshold voltage Vth of the first transistor T1 is stored in the storage capacitor.

In addition, in the data write and compensation stage, a second reset voltage is also applied to the first electrode of the light-emitting element, causing subsequent light emission based on the written data.

In the light emission stage, the light emission control signal is set as a valid level, while the scan signal, the compensation control signal, the first reset control signal, and the second reset control signal are set as an invalid level.

In this way, the first transistor T1, the fourth transistor T4, and the fifth transistor T5 are turned on, and the remaining transistors are turned off. The current flows from VDD to VSS. At this time, the voltage of the first node N1 is still Vdata+Vth due to the storage capacitor, the voltage of the second node is VDD, and the voltage of the third node N3 is the voltage of the first electrode of the light-emitting element. A gate-source voltage difference of the first transistor T1 is: Vgs=N1 voltage-N2 voltage=Vdata+Vth−VDD, and the driving current flowing through the light-emitting element is $I=K(Vgs-Vth)^2=K(Vdata+Vth-VDD-Vth)^2=K(Vdata-VDD)^2$, where, K is an intrinsic factor of the transistor. From this, it may be seen that the driving current I flowing through the light-emitting element is independent of the threshold voltage Vth of the first transistor T1, and the pixel circuit implements compensation for the threshold voltage Vth of the first transistor T1.

With respect to each skip frame after the write frame within each display cycle, there is no need to write data again, as long as the current path from the first power terminal to the second power terminal may be ensured, so the compensation control signal and the first reset control signal may keep as an invalid level during the skip frame.

In addition, in order to balance display brightness of each frame, since display brightness is related to a duty cycle of the light emission control signal, the light emission control signal (EM) in the skip frame still needs to be the same as the duty cycle of the light emission control signal (EM) in the write frame, rather than being kept as a valid level.

Further, in the write frame, after the light emission control signal changes from a valid level to an invalid level, there will be a charge release process at the first electrode of the light-emitting element due to presence of the parasitic capacitor, and in the data write and compensation stage, reset of the voltage of the first electrode (shown as N4) of the light-emitting element is completed. When entering the light emission stage, the light emission control signal is set as a valid level again, and there will be a process of charging the parasitic capacitor, so there will be a voltage reducing process and following voltage increasing process on the first electrode of the light-emitting element. Therefore, in the skip frame, in order to keep same display brightness of the light-emitting elements in the respective display frames, it is also necessary to form the voltage reducing process and following voltage increasing process on the first electrode of the light-emitting element in each skip frame. In this way, with respect to each display frame (the write frame and each skip frame), it is always the case that charging the parasitic capacitor of the light-emitting element is started from the second reset voltage when entering the light emission stage, until the voltage is stable.

That is, the skip frame includes a light emission reset stage corresponding to the data write and compensation stage in the write frame, as well as a light emission stage corresponding to the light emission stage in the write frame.

In the light emission reset stage, the second reset control signal is set as a valid level, while the writing control signal, the compensation control signal, the first reset control signal, and the light emission control signal are all set as an invalid level.

In this way, the first transistor T1, as well as the second transistor T2 and seventh transistor T7 controlled solely by the scan signal, are turned on, the remaining transistors are turned off. The light-emitting element will not emit light. By turning on the seventh transistor T7, a second reset voltage (Vint1) may be applied to the first electrode of the light-emitting element.

Timings of respective signals and the operation process of the circuit in the light emission stage are similar to those in the write frame, that is, only EM is of a valid level, and no details will be repeated here.

In stages other than the light emission reset stage and the light emission stage of the skip frame, the scan signal, the compensation control signal, the first reset control signal, and the light emission control signal are all set as an invalid level.

Figure 3A:
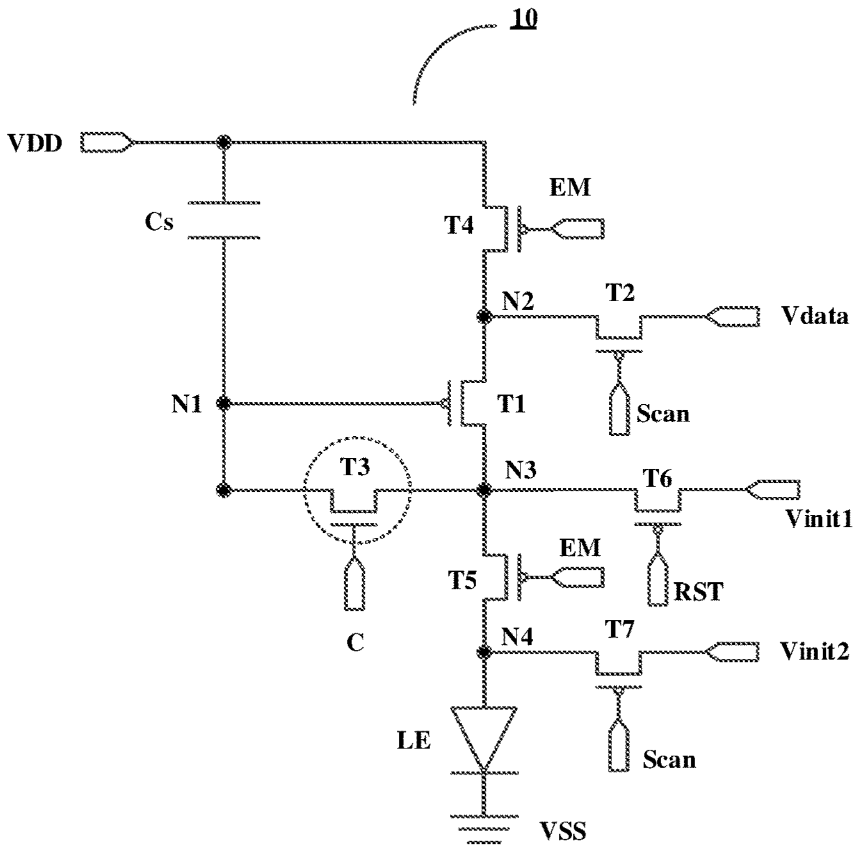
FIG. 3A to FIG. 3B show a circuit diagram and a corresponding timing diagram of a second example circuit structure of the pixel circuit, in conjunction with low-frequency display, according to the embodiment of the present disclosure.
Figure 3B:
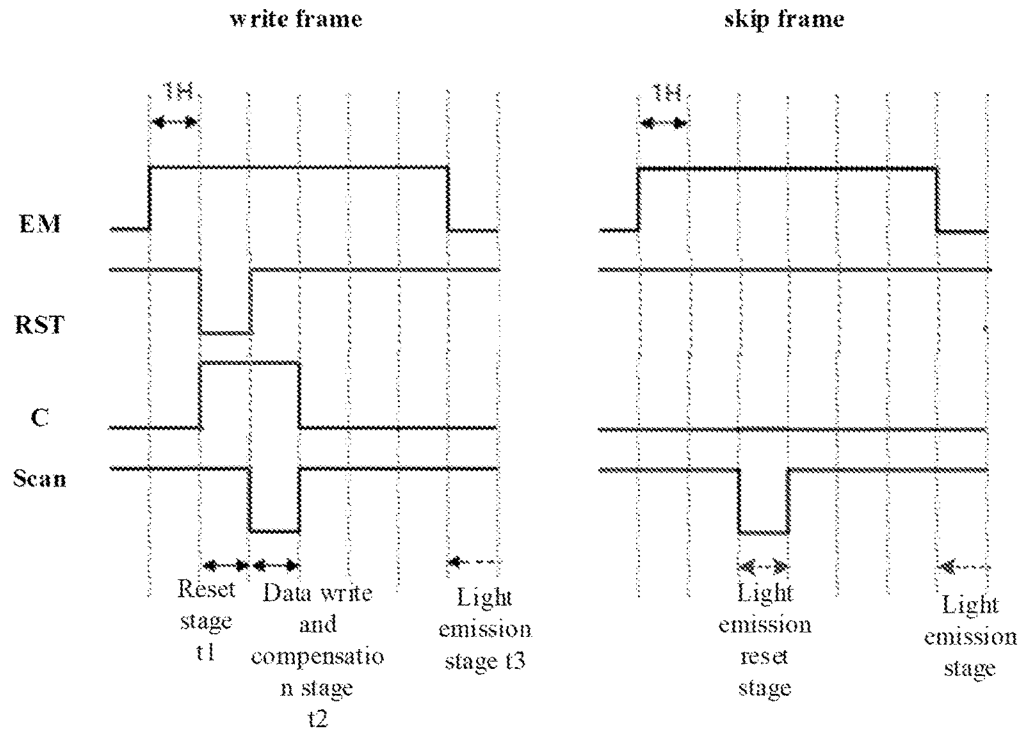

FIG. 3A to FIG. 3B show a circuit diagram and a corresponding timing diagram of a second example circuit structure of the pixel circuit, in conjunction with low-frequency display.

Since the second example circuit structure is mostly the same as the first example structure shown in FIG. 2A, only different portions will be described below.

As shown in FIG. 3A, the driving circuit, the data writing circuit, the compensation circuit, the light emission control circuit, and the second reset circuit are all the same as those in the first example structure described with reference to FIG. 2A.

In FIG. 3A, the first reset circuit includes a sixth transistor (T6). A gate electrode of the sixth transistor is used for receiving the first reset control signal, a first electrode of the sixth transistor is connected with the third node, and a second electrode of the sixth transistor is used for receiving the first reset voltage.

Similarly, the third transistor directly connected with the storage capacitor may be selected as an oxide transistor, to avoid leakage of the storage capacitor.

Hereinafter, a driving manner and an operation process of the pixel circuit shown in FIG. 3A will be described in conjunction with FIG. 3B.

As shown in FIG. 3B, similarly, with respect to the write frame, a reset stage (t1), a data write and compensation stage (t2), and a light emission stage (t3) are included.

In the reset stage, the first reset control signal and the compensation control signal are set as a valid level, while the scan signal and the light emission control signal are set as an invalid level.

In this way, since the first reset control signal and the compensation control signal are set as a valid level, the third transistor (T3) and sixth transistor (T6) are turned on, the remaining transistors are all turned off, to supply the first reset voltage to the first node (N1) via the turned-on T3 and T6. At this time, the voltage of the first node is Vint1, and the voltage of the second node, the third node, and the first electrode of the light-emitting element float after the end of the previous stage.

In the data write and compensation stage, the first reset control signal and the light emission control signal are set as an invalid level, while the scan signal and the compensation control signal are set as a valid level.

In this way, the first transistor T1, the second transistor T2, the third transistor T3 and the seventh transistor T7 are turned on, the remaining transistors are turned off, and the first transistor T1 forms a diode connection. The data signal Data sequentially passes through the second transistor T2, the first transistor T1, and the third transistor T3 to charge the first node N1, and charging is completed until the voltage of the first node N1 is Vdata+Vth. The voltage of the second node N2 is Vdata, and the voltage of the third node N3 is Vdata+Vth, so as to complete extraction of the threshold voltage Vth of the first transistor T1 and writing of the data voltage Vdata. At this time, the voltage on the storage capacitor is Vdata+Vth−VDD, that is, the threshold voltage Vth of the first transistor T1 is stored in the storage capacitor.

In addition, in the data write and compensation stage, a second reset voltage is also applied to the first electrode of the light-emitting element, causing subsequent light emission based on the written data.

In the light emission stage, the light emission control signal is set as a valid level, while the scan signal, the compensation control signal, the first reset control signal, and the second reset control signal are set as an invalid level.

In this way, the first transistor T1, the fourth transistor T4, and the fifth transistor T5 are turned on, the remaining transistors are turned off, and the current flows from VDD to VSS. At this time, the voltage of the first node N1 is still Vdata+Vth due to the storage capacitor, the voltage of the second node is VDD, and the voltage of the third node N3 is the voltage of the first electrode of the light-emitting element. A gate-source voltage difference of the first transistor T1 is: Vgs=N1 voltage−N2 voltage=Vdata+Vth−VDD, and the driving current flowing through the light-emitting element is $I=K(Vgs-Vth)^2=K(Vdata+Vth-VDD-Vth)^2=K(Vdata-VDD)^2$, where, K is an intrinsic factor of the transistor. From this, it may be seen that the driving current I flowing through the light-emitting element is independent of the threshold voltage Vth of the first transistor T1, and the pixel circuit implements compensation for the threshold voltage Vth of the first transistor T1.

Similarly, the skip frame includes a light emission reset stage corresponding to the data write and compensation stage in the write frame, as well as a light emission stage corresponding to the light emission stage in the write frame.

More details of the light emission reset stage and the light emission stage are the same as the contents described above with reference to FIG. 2B, and no details will be repeated here.

Figure 4A:
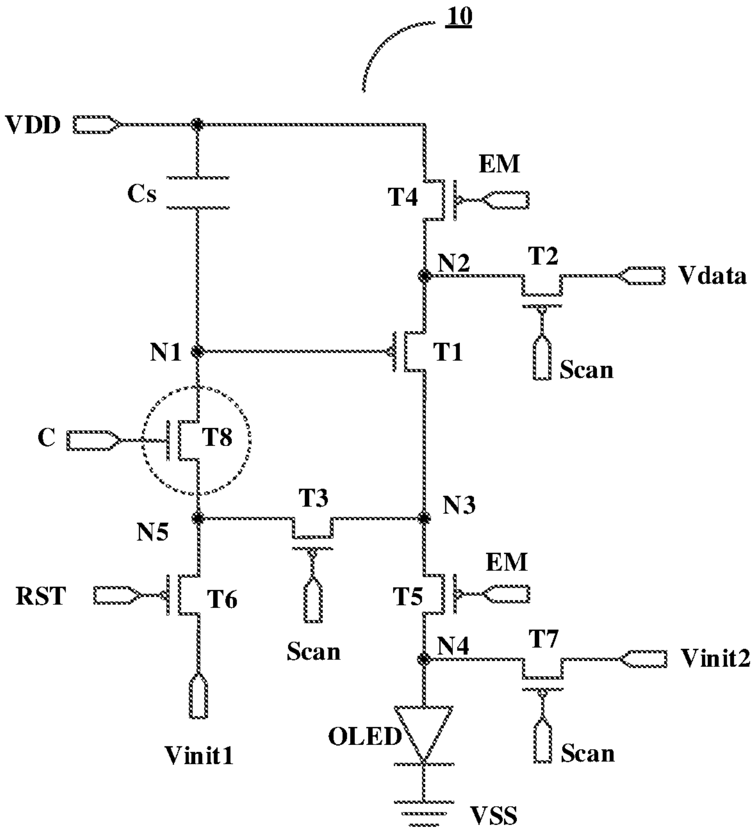
FIG. 4A to FIG. 4B show a circuit diagram and a corresponding timing diagram of a third example circuit structure of the pixel circuit, in conjunction with low-frequency display, according to the embodiment of the present disclosure.
Figure 4B:
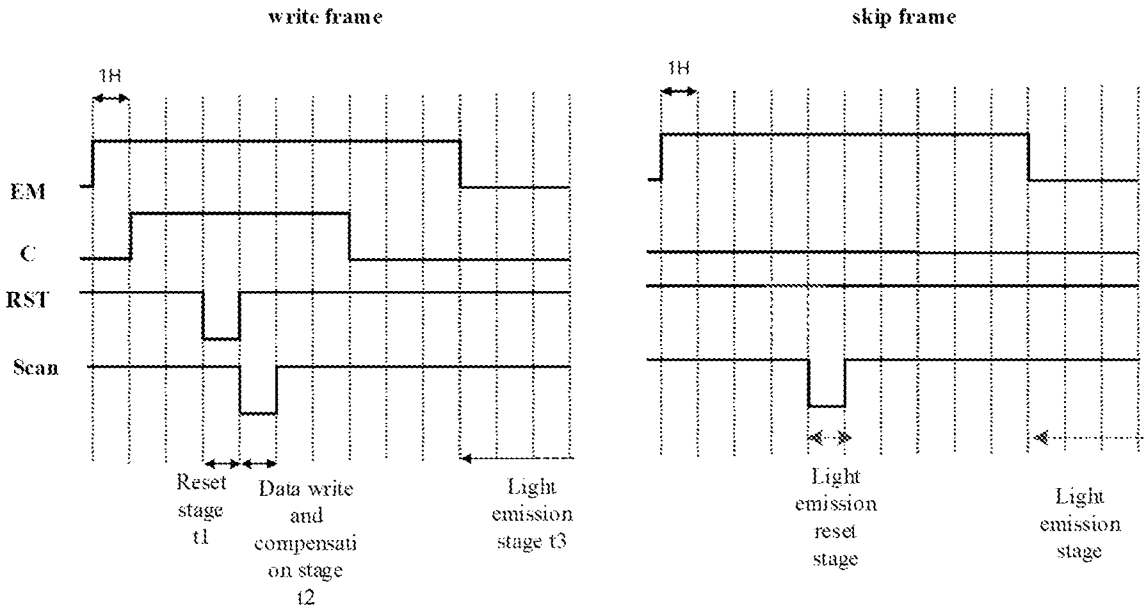

FIG. 4A to FIG. 4B show a circuit diagram and a corresponding timing diagram of a third example circuit structure of the pixel circuit, in conjunction with low-frequency display.

Since the third example circuit structure is mostly the same as the first and second example structures, only different portions will be described below.

As shown in FIG. 4A, the driving circuit, the data writing circuit, the light emission control circuit, the first reset circuit, and the second reset circuit are all the same as those in the first example structure described with reference to FIG. 2A.

In FIG. 4A, the compensation circuit includes a third transistor (T3), an eighth transistor (T8), and a storage capacitor.

A gate electrode of the third transistor (T3) is used for receiving the scan signal. A first electrode of the third transistor is connected with the third node, a second electrode of the third transistor is connected with a fifth node, and the third transistor (T3) may connect the third node and the fifth node under control of the scan signal.

A first electrode of the eighth transistor (T8) is connected with the fifth node, a second electrode of the eighth transistor (T8) is connected with the first electrode of the storage capacitor and the first node, a second electrode of the storage capacitor is connected with the first power terminal for receiving the first power voltage (VDD), and the eighth transistor (T3) may connect the fifth node and the first node under control of the compensation control signal, and further connect the third node and the first node (the scan signal is set as a valid level during compensation).

Similarly, the eighth transistor directly connected with the storage capacitor may be selected as an oxide transistor, to avoid leakage of the storage capacitor.

Hereinafter, a driving manner and an operation process of the pixel circuit shown in FIG. 4A will be described in conjunction with FIG. 4B.

As shown in FIG. 4B, similarly, with respect to the write frame, a reset stage (t1), a data write and compensation stage (t2), and a light emission stage (t3) are included.

In the reset stage, the first reset control signal and the compensation control signal are set as a valid level, while the scan signal and the light emission control signal are set as an invalid level.

In this way, since the first reset control signal and the compensation control signal are set as a valid level, the sixth transistor (T6) and eighth transistor (T8) are turned on, the remaining transistors are all turned off, to supply the first reset voltage to the first node (N1) via the turned-on T3 and T6. At this time, the voltage of the first node and the fifth node is Vint1, and voltages of the second node, the third node, and the first electrode (the fourth node) of the light-emitting element are the voltages thereof at the end of the previous stage.

In the data write and compensation stage, the first reset control signal and the light emission control signal are set as an invalid level, while the scan signal and the compensation control signal are set as a valid level.

In this way, the first transistor T1, the second transistor T2, the third transistor T3, the seventh transistor T7 and the eighth transistor T8 are turned on, the remaining transistors are turned off, and the first transistor T1 forms a diode connection. The data signal Data sequentially passes through the second transistor T2, the first transistor T1, the third transistor T3 and the eighth transistor T8 to charge the first node N1, and charging is completed until the voltage of the first node N1 is Vdata+Vth. The voltage of the second node N2 is Vdata, and the voltage of the third node N3 and the fifth node N5 is Vdata+Vth, so as to complete extraction of the threshold voltage Vth of the first transistor T1 and writing of the data voltage Vdata. At this time, the voltage on the storage capacitor is Vdata+Vth−VDD, that is, the threshold voltage Vth of the first transistor T1 is stored in the storage capacitor.

In addition, in the data write and compensation stage, a second reset voltage is also applied to the first electrode of the light-emitting element, causing subsequent light emission based on the written data.

In the light emission stage, the light emission control signal is set as a valid level, while the scan signal, the compensation control signal, the first reset control signal, and the second reset control signal are set as an invalid level.

In this way, the first transistor T1, the fourth transistor T4, and the fifth transistor T5 are turned on, the remaining transistors are turned off. The current flows from VDD to VSS. At this time, the voltage of the first node N1 is still Vdata+Vth due to the storage capacitor, the voltage of the second node is VDD, the voltage of the third node N3 is the voltage of the first electrode (N4) of the light-emitting element, and the voltage of the fifth node floats after the end of the previous stage. A gate-source voltage difference of the first transistor T1 is: Vgs=N1 voltage−N2 voltage=Vdata+Vth−VDD, and the driving current flowing through the light-emitting element is $I=K(Vgs-Vth)^2=K(Vdata+Vth-VDD-Vth)^2=K(Vdata-VDD)^2$, where, K is an intrinsic factor of the transistor. From this, it may be seen that the driving current I flowing through the light-emitting element is independent of the threshold voltage Vth of the first transistor T1, and the pixel circuit implements compensation for the threshold voltage Vth of the first transistor T1.

Similarly, the skip frame includes a light emission reset stage corresponding to the data write and compensation stage in the write frame, as well as a light emission stage corresponding to the light emission stage in the write frame.

More details of the light emission reset stage and the light emission stage are the same as the contents described above with reference to FIG. 2B and FIG. 3B, and no details will be repeated here.

The respective transistors in the respective example circuit structures described above with reference to FIG. 2A, FIG. 3A, and FIG. 4A and the circuit structures to be described below may be selected as P-type or N-type as needed, and corresponding valid level may be respectively a low level and a high level. When the transistor is of P-type, the first electrode refers to a source electrode and the second electrode refers to a drain electrode; similarly, when the transistor is of N-type, the first electrode refers to a drain electrode and the second electrode refers to a source electrode.

The pixel circuits described above with reference to FIG. 1A to FIG. 4B adopt the LPTO technology, and thus may have low driving power consumption during low-frequency display. Moreover, since a light emission reset stage is still set in the skip frame, display brightness of each display frame within each display cycle may be balanced, resulting in a good display effect.

The applicant further finds that the above-described pixel circuit brings the above-described benefits, but also has certain drawbacks. In the above-described pixel circuit, a light emission reset stage is set in the skip frame, and the scan signal in the light emission reset stage is a valid signal, so the scan signal is still at a high frequency, even in the case of low-frequency display. It may be seen in conjunction with FIG. 2A to FIG. 4B that when the light emission control signal is set as an invalid level and thus the fourth transistor T4 is turned off, the data voltage will be frequently applied to the second node N2. Due to the parasitic capacitor between the first node N1 and the second node N2, voltage fluctuation of the second node N2 in the skip frame will cause certain interference to the voltage of the first node N1, which may change the voltage stored in the storage capacitor. As a result, the gate-source voltage of the driving transistor will change during the light emission stage, which will affect display brightness of the OLED.

In the write frame, during the light emission stage, due to presence of the storage capacitor, the voltage of the first node N1 is Vdata+Vth, the voltage of the second node is VDD, and it is hoped that the voltage difference between the two nodes may also be kept in the skip frame, so that display brightness of a light-emitting element of each pixel circuit is stable during low-frequency display, thereby stabilizing the display picture of the display panel.

Therefore, the embodiment of the present disclosure further proposes an improved pixel circuit, to not only implement the benefits of the pixel circuit as described above, but also make the display picture of the display panel more stable during low-frequency display.

Figure 5:
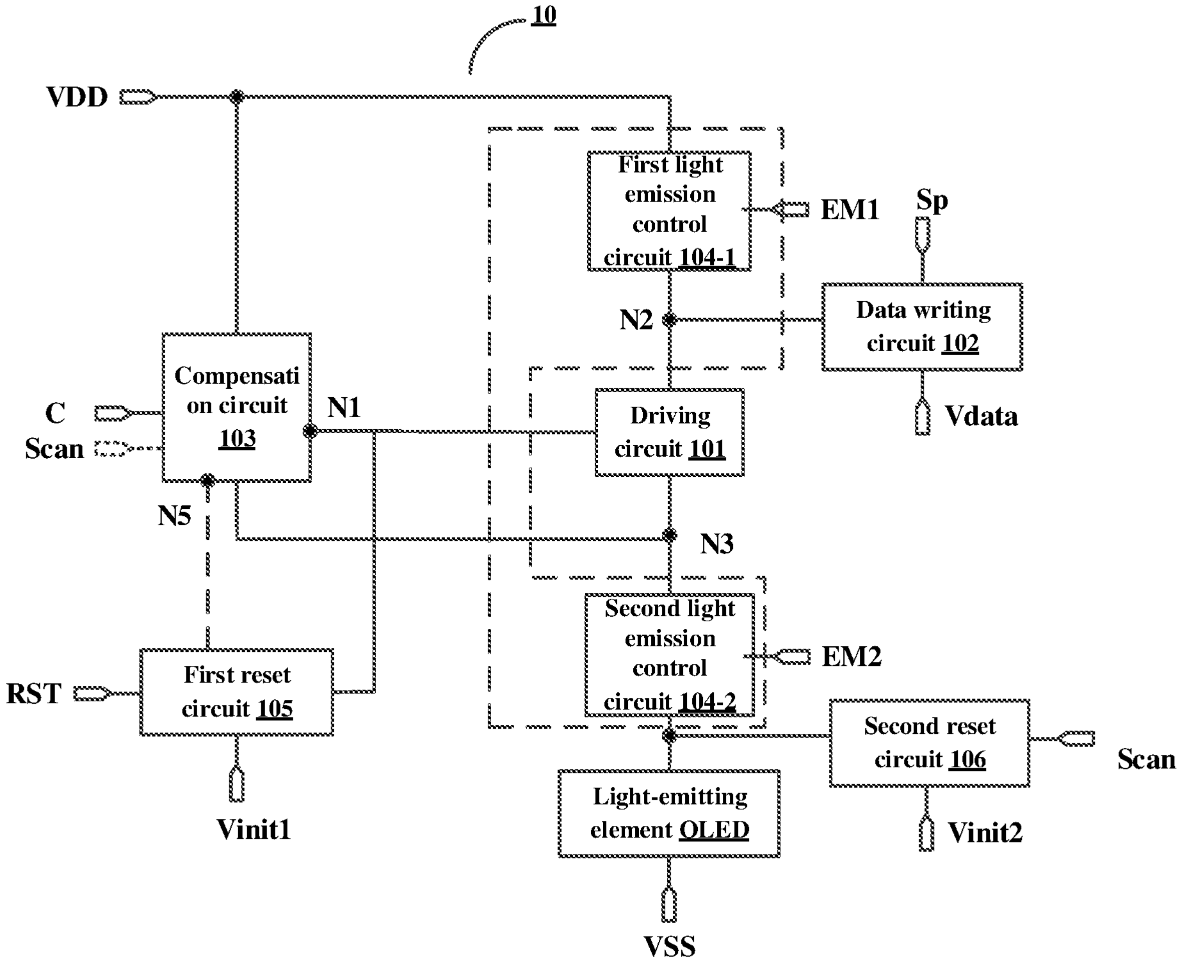
FIG. 5 shows a structural block diagram of another pixel circuit based on the LTPO technology, in conjunction with low-frequency display, according to an embodiment of the present disclosure.

FIG. 5 shows a structural block diagram of an improved pixel circuit, in conjunction with low-frequency display, according to an embodiment of the present disclosure. The pixel circuit shown in FIG. 5 has a same structure as the pixel circuit described with reference to FIG. 1A, except for adjustments in signals controlling respective portions of the circuit.

As shown in FIG. 5, similarly, the pixel circuit 10 includes: a driving circuit 101, a data writing circuit 102, a compensation circuit 103, light emission control circuits 104 (104-1 and 104-2), a first reset circuit 105, and a second reset circuit 106.

The driving circuit 101 includes a control terminal, a first terminal, and a second terminal, and is used for controlling a driving current flowing through the first terminal and the second terminal for driving the light-emitting element to emit light.

The data writing circuit 102 is used for writing a data signal to the first terminal (N2) of the driving circuit under control of a writing control signal.

The compensation circuit 103 is used for electrically connecting the control terminal (N1) and the second terminal (N3) of the driving circuit under control of a compensation control signal, or under control of the compensation control signal and the writing control signal, and storing the voltage at the control terminal of the driving circuit.

The light emission control circuit 104 is used for causing the driving current to flow through the light-emitting element under control of the light emission control signal.

Optionally, the light emission control circuit may include a first light emission control circuit and a second light emission control circuit, and correspondingly, the light emission control signal may include a first light emission control signal and a second light emission control signal. The first light emission control circuit is used for applying a first power voltage (VDD) of a first power terminal to the first terminal of the driving circuit under control of the first light emission control signal (EM1). The second light emission control circuit is used for applying the driving current from the second terminal of the driving circuit to a first electrode of the light-emitting element under control of the second light emission control signal (EM2). The first light emission control signal and the second light emission control signal may be a same signal or different signals.

The first reset circuit is used for applying a first reset voltage to the control terminal of the driving circuit under control of a first reset control signal.

The second reset circuit is used for applying a second reset voltage to the first electrode of the light-emitting element under control of a second reset control signal.

In this way, by making the high-frequency signal needed in the skip frame, i.e., the second reset control signal (still shown as Scan) independent of the writing control signal, and making the writing control signal invalid in the skip frame, data will not be input to the second node N2, and thus will not cause voltage fluctuation in the first node N1, due to superior leakage current characteristics of the oxide transistor, the voltage of the first node N1 may still be kept at Vdata+Vth at the end of the previous light emission stage. When the light emission control signal (in a case where the first light emission control signal and the second light emission control signal are the same) becomes a valid level in the skip frame, the voltage of the second node N2 is VDD, so, a voltage difference between the first node N1 and the second node is still the same as the voltage difference in the write frame, and therefore, display brightness is stable, and a display effect of the display panel is also stable. At this time, a second reset control signal that appears in each display frame may be considered to have same characteristics, for example, have a level changed from an invalid level to a valid level at a same time instant in each display frame, and then continue for a same duration to recover to the invalid level.

In addition, in order to better stabilize the voltage of the second node N2 at the first power voltage VDD, in addition to making the second reset control signal independent of the writing control signal, the first light emission control signal and the second light emission control signal may also be additionally set as different signals in the skip frame.

For example, the first light emission control signal (EM1) and the second light emission control signal (EM2) are synchronized within the write frame, and in each skip frame after the write frame, the first light emission control signal (EM1) is of a valid level, and the second light emission control signal has same characteristics as the second light emission control signal in the write frame.

In this way, at a start point of each skip frame, the first light emission control circuit is enabled (i.e. the fourth transistor T4 is turned on), so that the first power voltage VDD is applied to the second node N2, and before entering the light emission stage, the voltage of the second node N2 is stabilized at VDD, which thus further stabilizes display brightness during the light emission stage.

That is to say, in the skip frame, only the second reset control signal, or only the second reset control signal and the second light emission control signal are still shifted in rows (e.g., shifted from the first row of pixels to the last row of pixels), while the remaining signals are all kept as an invalid level or a valid level.

Figure 6A:
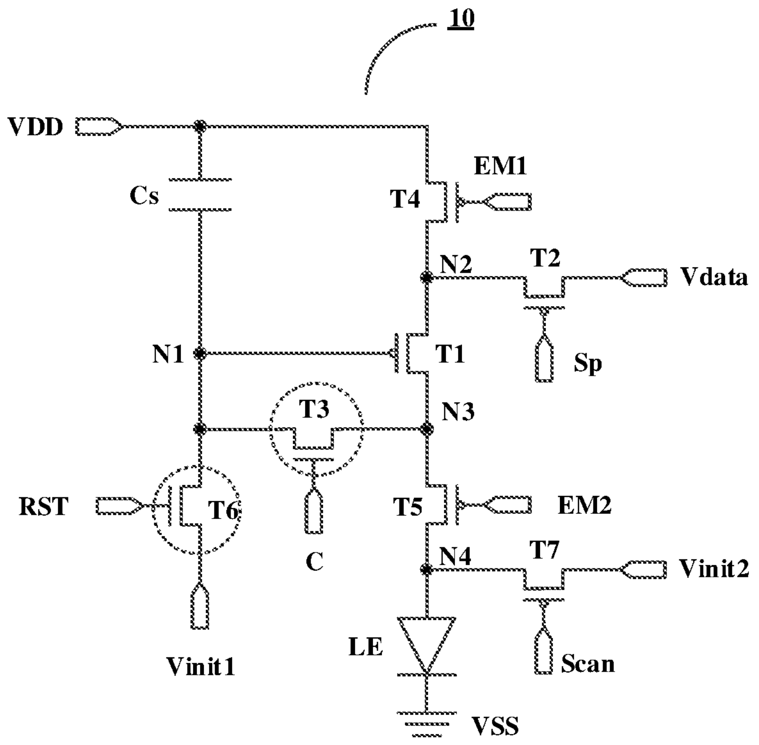
FIG. 6A to FIG. 6B show a circuit diagram and a corresponding timing diagram of a first example circuit structure of the other pixel circuit, in conjunction with low-frequency display, according to the embodiment of the present disclosure.
Figure 6B:
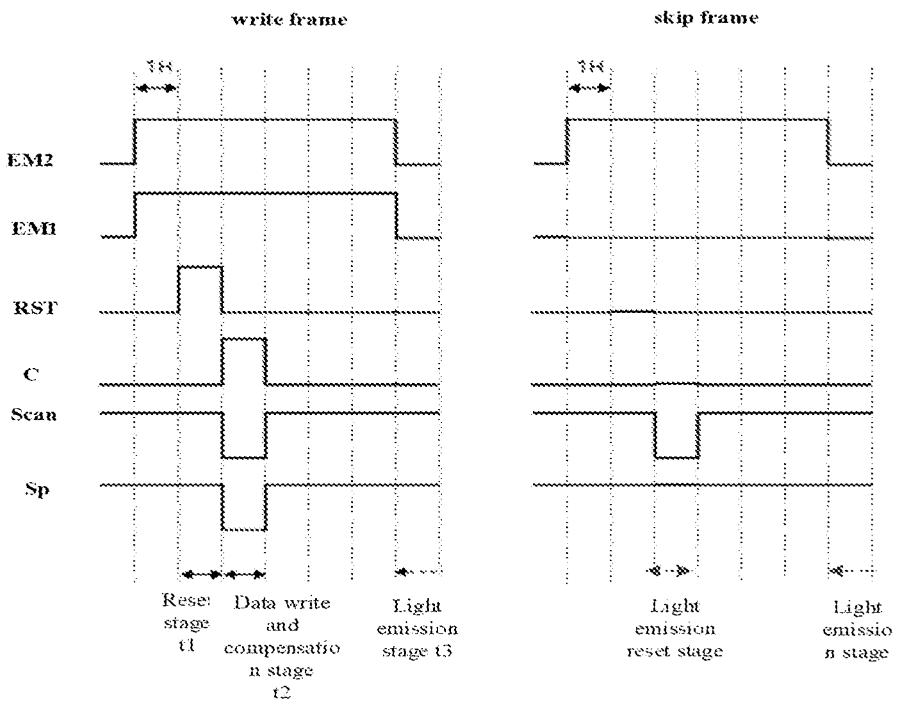

FIG. 6A to FIG. 6B show a circuit diagram and a corresponding timing diagram of a first example circuit structure of the improved pixel circuit, in conjunction with low-frequency display. This corresponds to the circuit diagram described above with reference to FIG. 2A.

As shown in FIG. 6A, similar to FIG. 2A, the driving circuit includes a first transistor (T1). A gate electrode of the first transistor serves as the control terminal of the driving circuit and is connected with a first node (N1), a first electrode of the first transistor serves as the first terminal of the driving circuit and is connected with a second node (N2), and a second electrode of the first transistor serves as the second terminal of the driving circuit and is connected with a third node (N3).

The data writing circuit includes a second transistor (T2). A gate electrode of the second transistor is used for receiving the writing control signal (Sp), a first electrode of the second transistor is used for receiving the data signal (Vdata), and a second electrode of the second transistor is connected with the second node (N2).

The compensation circuit includes a third transistor and a storage capacitor. A gate electrode of the third transistor (T3) is used for receiving the compensation control signal (C), a first electrode of the third transistor is connected with the third node, a second electrode of the third transistor is connected with the first electrode of the storage capacitor and the first node, and a second electrode of the storage capacitor is connected with the first power terminal for receiving the first power voltage.

The first light emission control circuit includes a fourth transistor (T4). A gate electrode of the fourth transistor is used for receiving the first light emission control signal (EM1), a first electrode of the fourth transistor is connected with the first power terminal for receiving the first power voltage, and a second electrode of the fourth transistor is connected with the second node (N2).

The second light emission control circuit includes a fifth transistor (T5). A gate electrode of the fifth transistor is used for receiving the second light emission control signal (EM2), a first electrode of the fifth transistor is connected with the third node (N3), and a second electrode of the fifth transistor is connected with the first electrode (serving as the fourth node) of the light-emitting element.

The first reset circuit includes a sixth transistor (T6). A gate electrode of the sixth transistor is used for receiving the first reset control signal (RST), a first electrode of the sixth transistor is connected with the first node, and a second electrode of the sixth transistor is used for receiving the first reset voltage.

The second reset circuit includes a seventh transistor (T7). A gate electrode of the seventh transistor is used for receiving the second reset control signal (Scan), a first electrode of the seventh transistor is connected with the first electrode of the light-emitting element, and a second electrode of the seventh transistor is used for receiving the second reset voltage.

Optionally, the second reset control signal may be a scan signal of the pixel circuit, for example, a signal generated by a GOA circuit and shifted in rows, to be applied to respective rows of pixel circuits.

Optionally, the third transistor T3 and the sixth transistor T6 are still selected as oxide transistors, while the remaining transistors are still selected as low-temperature polycrystalline silicon transistors.

Hereinafter, a driving manner and an operation process of the pixel circuit shown in FIG. 6A will be described in conjunction with FIG. 6B.

It should be noted that the timing diagram described below with reference to FIG. 6B is for the case of low-frequency display, while in the case of high-frequency display, driving timing of each display frame is the same as timing of the write frame described with reference to FIG. 6B, and thus will not be described.

As shown in FIG. 6B, with respect to the write frame, a reset stage, a data write and compensation stage, and a light emission stage are included.

In the reset stage, the first reset control signal is set as a valid level, while the writing control signal, the second reset control signal, the compensation control signal, the first light emission control signal, and the second light emission control signal are set as an invalid level.

In this way, since the first reset control signal is of a valid level, the sixth transistor (T6) is turned on, and the remaining transistors are all turned off, to supply the first reset voltage to the first node (N1). At this time, voltages of the first node is Vint1, and the voltage of the second node, the third node, and the first electrode (the fourth node) of the light-emitting element float after the end of the previous stage.

In the data write and compensation stage, the first reset control signal, the first light emission control signal, and the second light emission control signal are set as an invalid level, while the writing control signal, the second reset control signal, and the compensation control signal are set as a valid level.

In this way, the first transistor T1, the second transistor T2, the third transistor T3 and the seventh transistor T7 are turned on, the remaining transistors are turned off, and the first transistor T1 forms a diode connection. The data signal Data sequentially passes through the second transistor T2, the first transistor T1, and the third transistor T3 to charge the first node N1, and charging is completed until the voltage of the first node N1 is Vdata+Vth. The voltage of the second node N2 is Vdata, and the voltage of the third node N3 is Vdata+Vth, so as to complete extraction of the threshold voltage Vth of the first transistor T1 and writing of the data voltage Vdata. At this time, a voltage on the storage capacitor is Vdata+Vth−VDD, that is, the threshold voltage Vth of the first transistor T1 is stored in the storage capacitor.

In addition, in the data write and compensation stage, a second reset voltage is also applied to the first electrode of the light-emitting element, causing subsequent light emission based on the written data.

In the light emission stage, the first light emission control signal and the second light emission control signal are set as a valid level, while the writing control signal, the second reset control signal, the compensation control signal, the first reset control signal, and the second reset control signal are set as an invalid level.

In this way, the first transistor T1, the fourth transistor T4, and the fifth transistor T5 are turned on, and the remaining transistors are turned off. The current flows from VDD to VSS. At this time, the voltage of the first node N1 is still Vdata+Vth due to the storage capacitor, the voltage of the second node is VDD, and the voltage of the third node N3 is the voltage of the first electrode of the light-emitting element. A gate-source voltage difference of the first transistor T1 is: Vgs=N1 voltage-N2 voltage=Vdata+Vth−VDD, and the driving current flowing through the light-emitting element is $I=K(Vgs-Vth)^2=K(Vdata+Vth-VDD-Vth)^2=K(Vdata-VDD)^2$, where, K is an intrinsic factor of the transistor. From this, it may be seen that the driving current I flowing through the light-emitting element is independent of the threshold voltage Vth of the first transistor T1, and the pixel circuit implements compensation for the threshold voltage Vth of the first transistor T1.

In the write frame, the writing control signal (Sp) and the second reset control signal (Scan) are synchronized.

With respect to each skip frame, the first light emission control signal (EM1) is kept as a valid level in the skip frame, and the writing control signal (Sn) is kept as an invalid level. In addition, the compensation control signal (C) and the first reset signal (RST) are also kept as an invalid level.

In this way, the voltage of the second node in each skip frame is kept as the first power voltage VDD.

Similarly, each skip frame includes a light emission reset stage corresponding to the data write and compensation stage in the write frame, as well as a light emission stage corresponding to the light emission stage in the write frame.

In the light emission reset stage, the first light emission control signal is set as a valid level, the writing control signal is set as an invalid level, the second reset control signal is set as a valid level, and the compensation control signal, the first reset control signal, and the second light emission control signal are all set as an invalid level.

In this way, the first transistor T1, the fourth transistor T4, and the seventh transistor T7 are turned on, the remaining transistors are turned off, and the light-emitting element will not emit light. By turning on the seventh transistor T7, a second reset voltage (Vint1) may be applied to the first electrode of the light-emitting element. The voltage of the second node N2 is kept as VDD.

In the light emission stage, the first light emission control signal is set as a valid level, the writing control signal is set as an invalid level, the second light emission control signal is set as a valid level, and the second reset control signal, the compensation control signal, and the first reset control signal are all set as an invalid level.

In this way, the driving current will flow from the first power voltage through T4, T1, T5 to the light-emitting element, causing the light-emitting element to emit light.

In stages other than the light emission reset stage and the light emission stage in the skip frame, the first light emission control signal is set as a valid level, the writing control signal is set as an invalid level, and the second reset control signal, the compensation control signal, the first reset control signal, and the second light emission control signal are set as an invalid level.

It may be known with reference to the timing diagram of FIG. 6B that in the skip frame, the second transistor controlled by the writing control signal is kept off, the data writing circuit is disabled, such that even if the second reset control signal (which may be a scan signal) needs to be of a high frequency to ensure uniform display brightness, the data voltage will not be frequently written to the second node N2 since the writing control signal is independent and invalid, and therefore, the voltage of the second node N2 may be relatively stable and will not interfere with the voltage of the first node N1.

Further, in the skip frame, the fourth transistor controlled by the first light emission control signal is kept on, so the first light emission control circuit is kept enabled, and therefore, the voltage of the second node N2 is kept at VDD, resulting in better stability.

It can be seen that independently setting the writing control signal and the second reset control signal, or independently setting the first light emission control signal and the second light emission control signal while independently setting the writing control signal and the second reset control signal, may optimize stability of the display picture during low-frequency display (by stabilizing the voltage of the second node N2). Although implementation of combination of the two modes are introduced in detail in FIG. 6A to FIG. 6B, an effect of stabilizing the display picture during low-frequency display may also be achieved by choosing only one of these two modes.

Figure 7A:
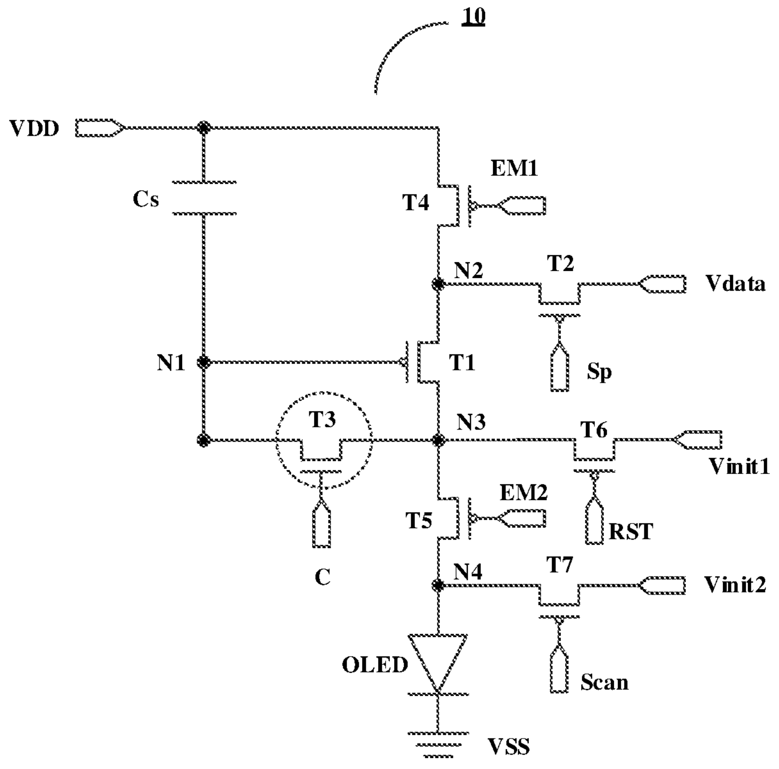
FIG. 7A to FIG. 7B show a circuit diagram and a corresponding timing diagram of a second example circuit structure of the other pixel circuit, in conjunction with low-frequency display, according to the embodiment of the present disclosure.
Figure 7B:
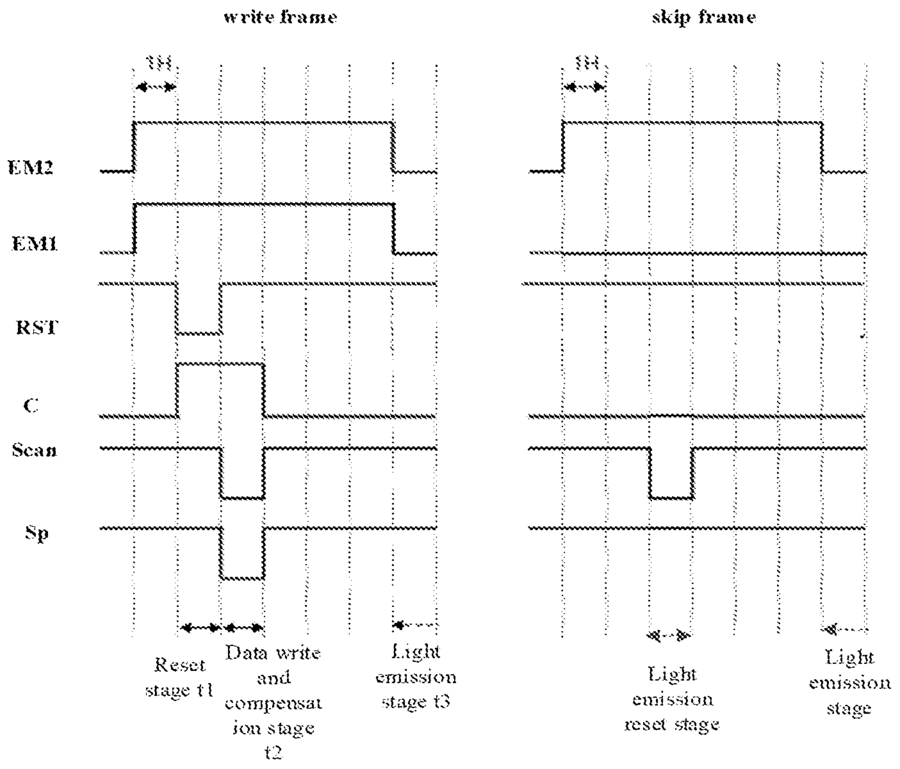

FIG. 7A to FIG. 7B show a circuit diagram and a corresponding timing diagram of a second example circuit structure of the other pixel circuit, in conjunction with low-frequency display. This corresponds to the circuit diagram as described above with reference to FIG. 3A.

Since the second example circuit structure is mostly the same as the first example structure described with reference to FIG. 6A, only different portions will be described below.

As shown in FIG. 7A, the driving circuit, the data writing circuit, the compensation circuit, the light emission control circuit, and the second reset circuit are all the same as those in the first example structure described with reference to FIG. 6A.

In FIG. 7A, the first reset circuit includes a sixth transistor (T6). A gate electrode of the sixth transistor is used for receiving the first reset control signal, a first electrode of the sixth transistor is connected with the third node, and a second electrode of the sixth transistor is used for receiving the first reset voltage.

Similarly, the third transistor (T3) directly connected with the storage capacitor may be selected as an oxide transistor, to avoid leakage of the storage capacitor.

Hereinafter, a driving manner and an operation process of the pixel circuit shown in FIG. 7A will be described in conjunction with FIG. 7B.

As shown in FIG. 7B, similarly, with respect to the write frame, a reset stage, a data write and compensation stage, and a light emission stage are included.

In the reset stage, the first reset control signal and the compensation control signal are set as a valid level, and the writing control signal, the second reset control signal, the first light emission control signal, and the second light emission control signal are set as an invalid level.

In this way, since the first reset control signal and the compensation control signal are set as a valid level, the third transistor (T3) and the sixth transistor (T6) are turned on, and the remaining transistors are all turned off, to supply the first reset voltage to the first node (N1) via the turned-on T3 and T6. At this time, the voltage of the first node is Vint1, and voltages of the second node, the third node, and the first electrode of the light-emitting element float after the end of the previous stage.

Driving manners and operation processes in the data write and compensation stage and the light emission stage are the same as or similar to the process described with reference to FIG. 6B, so description thereof is omitted here.

Similarly, in the write frame, the writing control signal and the second reset control signal are synchronized.

With respect to each skip frame, the first light emission control signal is kept as a valid level in the skip frame, and the writing control signal is kept as an invalid level. In addition, the compensation control signal and the first reset signal are also kept as an invalid level.

In this way, the voltage of the second node in each skip frame is kept as the first power voltage VDD.

Similarly, each skip frame includes a light emission reset stage corresponding to the data write and compensation stage in the write frame, as well as a light emission stage corresponding to the light emission stage in the write frame.

More details of the light emission reset stage and the light emission stage are the same as the contents described above with reference to FIG. 6B, and no details will be repeated here.

Figure 8A:
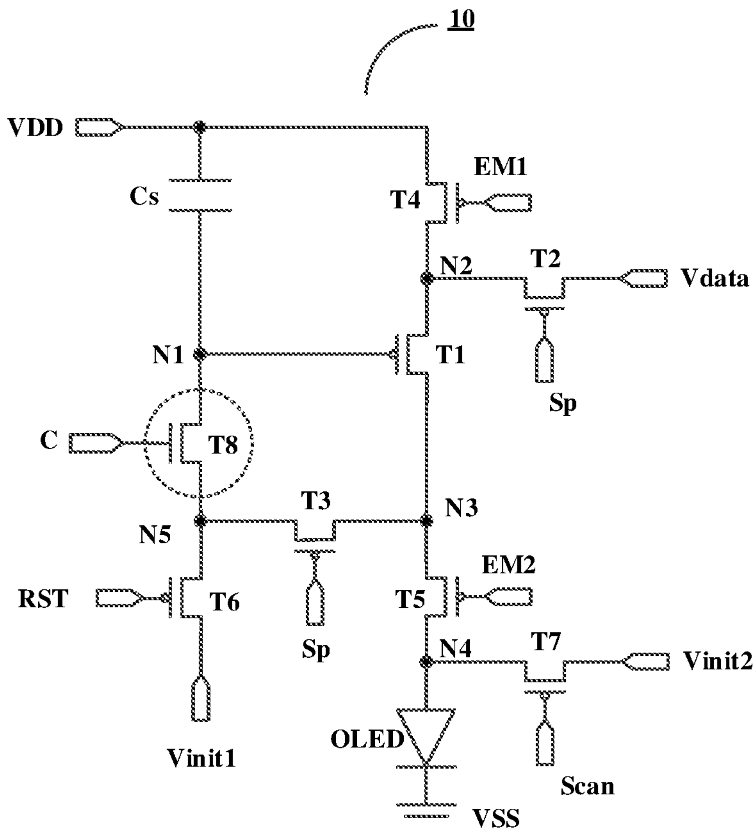
FIG. 8A to FIG. 8B show a circuit diagram and a corresponding timing diagram of a third example circuit structure of the other pixel circuit, in conjunction with low-frequency display, according to the embodiment of the present disclosure.
Figure 8B:
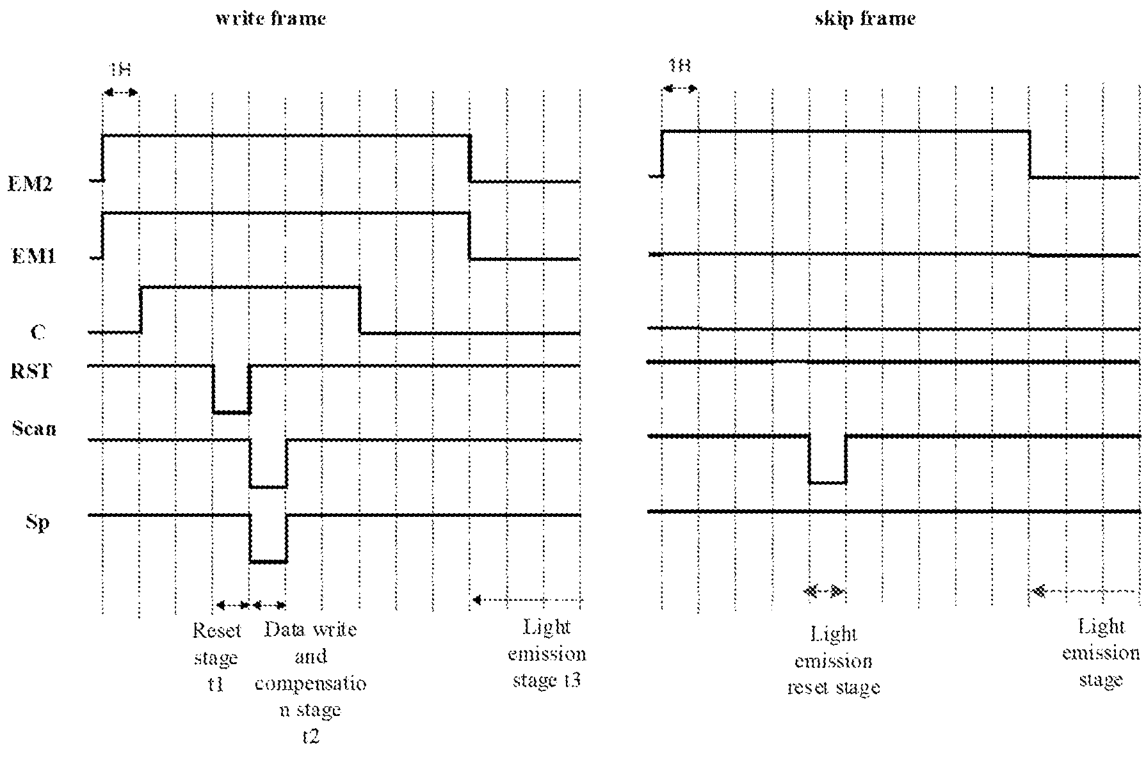

FIG. 8A to FIG. 8B show a circuit diagram and a corresponding timing diagram of a third example circuit structure of the other pixel circuit, in conjunction with low-frequency display. This corresponds to the circuit diagram described above with reference to FIG. 4A.

Since the third example circuit structure is mostly the same as the first and second example structures, only different portions will be described below.

As shown in FIG. 8A, the driving circuit, the data writing circuit, the light emission control circuit (the first and second light emission control circuits), the first reset circuit, and the second reset circuit are all the same as those in the first example structure described with reference to FIG. 6A.

In FIG. 8A, the compensation circuit includes a third transistor (T3), an eighth transistor (T8), and a storage capacitor.

A gate electrode of the third transistor (T3) is used for receiving a writing control signal, a first electrode of the third transistor is connected with the third node, a second electrode of the third transistor is connected with a fifth node, and the third transistor (T3) may connect the third node and the fifth node under control of the writing control signal.

A first electrode of the eighth transistor (T8) is connected with the fifth node, a second electrode of the eighth transistor (T8) is connected with the first electrode of the storage capacitor and the first node, a second electrode of the storage capacitor is connected with the first power terminal for receiving the first power voltage (VDD), and the eighth transistor (T3) may connect the fifth node and the first node under control of the compensation control signal.

Similarly, the eighth transistor directly connected with the storage capacitor may be selected as an oxide transistor, to avoid leakage of the storage capacitor.

Hereinafter, a driving manner and an operation process of the pixel circuit shown in FIG. 8A will be described in conjunction with FIG. 8B.

As shown in FIG. 8B, similarly, with respect to the write frame, a reset stage (t1), a data write and compensation stage (t2), and a light emission stage (t3) are included.

In the reset stage, the first reset control signal and the compensation control signal are set as a valid level, while the writing control signal, the second reset control signal, the first light emission control signal, and the second light emission control signal are set as an invalid level.

In this way, since the first reset control signal and the compensation control signal are set as a valid level, the sixth transistor (T6) and eighth transistor (T8) are turned on, and the remaining transistors are all turned off, to supply the first reset voltage to the first node (N1) via the turned-on T3 and T6. At this time, voltages of the first node and the fifth node are Vint1, and voltages of the second node, the third node, and the first electrode (the fourth node) of the light-emitting element are the voltages thereof at the end of the previous stage.

In the data write and compensation stage, the first reset control signal, the first light emission control signal, and the second light emission control signal are set as an invalid level, while the writing control signal, the second reset control signal, and the compensation control signal are set as a valid level.

In this way, the first transistor T1, the second transistor T2, the third transistor T3, the seventh transistor T7 and the eighth transistor T8 are turned on, the remaining transistors are turned off, and the first transistor T1 forms a diode connection. The data signal Data sequentially passes through the second transistor T2, the first transistor T1, the third transistor T3 and the eighth transistor T8 to charge the first node N1, and charging is completed until the voltage of the first node N1 is Vdata+Vth. The voltage of the second node N2 is Vdata, and the voltages of the third node N3 and the fifth node N5 are Vdata+Vth, so as to complete extraction of the threshold voltage Vth of the first transistor T1 and writing of the data voltage Vdata. At this time, the voltage on the storage capacitor is Vdata+Vth−VDD, that is, the threshold voltage Vth of the first transistor T1 is stored in the storage capacitor.

In addition, in the data write and compensation stage, the second reset control signal is set as a valid level, so a second reset voltage is also applied to the first electrode of the light-emitting element, causing subsequent light emission based on the written data.

In the light emission stage, the first light emission control signal and the second light emission control signal are set as a valid level, while the writing control signal, the compensation control signal, the first reset control signal, and the second reset control signal are set as an invalid level.

In this way, the first transistor T1, the fourth transistor T4, and the fifth transistor T5 are turned on, the remaining transistors are turned off. The current flows from VDD to VSS. At this time, the voltage of the first node N1 is still Vdata+Vth due to the storage capacitor, the voltage of the second node is VDD, the voltage of the third node N3 is the voltage of the first electrode (N4) of the light-emitting element, and the voltage of the fifth node floats after the end of the previous stage. A gate-source voltage difference of the first transistor T1 is: Vgs=N1 voltage-N2 voltage=Vdata+Vth−VDD, and the driving current flowing through the light-emitting element is $I=K(Vgs-Vth)^2=K(Vdata+Vth-VDD-Vth)^2=K(Vdata-VDD)^2$, where, K is an intrinsic factor of the transistor. From this, it may be seen that the driving current I flowing through the light-emitting element is independent of the threshold voltage Vth of the first transistor T1, and the pixel circuit implements compensation for the threshold voltage Vth of the first transistor T1.

Similarly, in the write frame, the writing control signal and the second reset control signal are synchronized.

With respect to each skip frame, the first light emission control signal is kept as a valid level in the skip frame, the writing control signal is kept as an invalid level, and the compensation control signal and the first reset control signal are kept as an invalid level.

In this way, the voltage of the second node in each skip frame is kept as the first power voltage VDD.

Similarly, each skip frame includes a light emission reset stage corresponding to the data write and compensation stage in the write frame, as well as a light emission stage corresponding to the light emission stage in the write frame.

More details of the light emission reset stage and the light emission stage are the same as the contents described above with reference to FIG. 6B and FIG. 7B, and no details will be repeated here.

The improved pixel circuits described with reference to FIG. 5 to FIG. 8B are improvements in stability of the display picture respectively for the pixel circuits as described in FIG. 1A and FIG. 2A to FIG. 4B. By making the high-frequency signal needed in the skip frame (i.e., the second reset control signal) independent of the writing control signal and making the writing control signal an invalid level in the skip frame, or, additionally further setting the first light emission control signal and the second light emission control signal as different signals in the skip frame and setting the first light emission control signal as a valid level in the skip frame, the voltage of the second node N2 may be stabilized during low-frequency display, so, the voltage difference between the first node N1 and the second node N2 is stable, making display brightness of the pixels more stable and a display effect of the display panel more stable.

Based on the above description of the structure and timing of the pixel circuit, the present disclosure further provides a driving method for the above-described pixel circuit.

The driving method includes: in a case where each display cycle sequentially includes one write frame and at least one skip frame: within the write frame, synchronizing the writing control signal and the second reset control signal, and including in the write frame: a reset stage, a data write and compensation stage, and a light emission stage; within each skip frame, keeping the writing control signal as an invalid level, making the second reset control signal of the skip frame have same characteristics as the second reset control signal of the write frame, and including in the skip frame: a light emission reset stage corresponding to the data write and compensation stage of the write frame and a light emission stage corresponding to the light emission stage within the write frame.

In addition, the driving method further includes: within the write frame, synchronizing the first light emission control signal (EM1) and the second light emission control signal (EM2); and within each skip frame, making the first light emission control signal (EM1) a valid level, making the second light emission control signal of the skip frame have same characteristics as the second light emission control signal of the write frame.

The specific details of each stage have been introduced in detail above with reference to FIG. 5 to FIG. 8B, and no details will be repeated here.

According to another aspect of the present disclosure, there is further provided a display apparatus.

Figure 9:
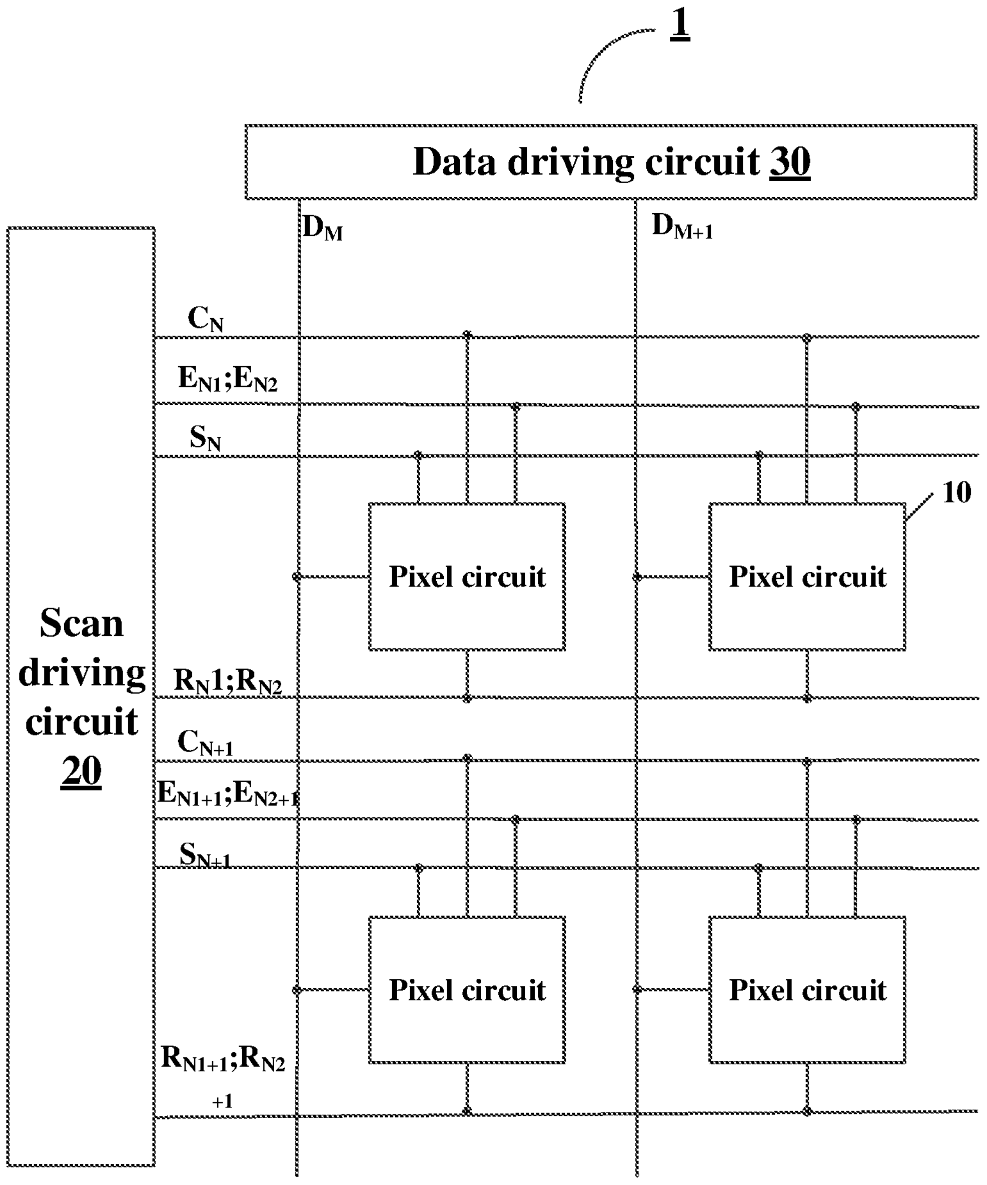
FIG. 9 shows a schematic diagram of a display apparatus according to an embodiment of the present disclosure.

FIG. 9 shows a schematic diagram of a display apparatus 900 according to an embodiment of the present disclosure.

As shown in FIG. 9, the display apparatus 900 includes: a plurality of pixel units 60 arranged in an array. For example, each pixel unit 60 may include any one of the pixel circuits described above with reference to FIG. 1A to FIG. 8B, for example, include the pixel circuit shown in FIG. 6A. The pixel units including other example pixel circuits are also similar, only have types and timings of signals connected with each pixel unit adaptively changed.

The display apparatus 900 may further include a plurality of writing control lines, a plurality of compensation control lines, a plurality of data lines, a plurality of light emission control lines (a plurality of first light emission control lines and a plurality of second light emission control lines), and a plurality of reset control lines (a plurality of first reset control lines and a plurality of second reset control lines). It should be noted that only some of the pixel units 60 and related connection lines are shown in FIG. 9. For example, SN represents a writing control line (supplying an Sp signal) of an Nth row, SN+1 represents a writing control line of an (N+1)th row; $C_N$ represents a compensation control line (supplying a C signal) of the Nth row, $C_{N+1}$ represents a compensation control line of the (N+1)th row; $R_{N1}$ and $R_{N2}$ represent a first reset control line (supplying an RST signal) and a second reset control line (supplying Scan signal) of the Nth row, $R_{N1+1}$ and $RN_{2+1}$ represent a first reset control line and a second reset control line of the (N+1)th row; $D_M$ represents a data signal line (supplying Vdata) of an Mth column, $D_{M+1}$ represents a data signal line of an (M+1)th column; $L_{N1}$ and $L_{N2}$ represent a first light emission control line (supplying EM1) and a second light emission control line (supplying EM2) of the Nth row, and $LN_{1+1}$ and $LN_{2+1}$ represent a first light emission control line and a second light emission control line of the (N+1)th row. Here, N and M are integers greater than 0, for example.

For example, each pixel unit 60 may include any one of the example pixel circuits as described above, for example, include the pixel circuit shown in FIG. 6A.

For example, a writing control line of each row is connected with data writing circuits in pixel circuits of the row (and may also be connected with compensation circuits, based on some structures of pixel circuit, for example, the pixel circuit shown by the dashed line in FIG. 5 or in FIG. 8A) to supply a writing control signal; a compensation control line of each row is connected with compensation circuits in pixel circuits of the row to supply a compensation control signal; a data line of each column is connected with data writing circuits in pixel circuits of the column to supply a data signal Vdata; a first reset control line of each row is connected with first reset circuits in pixel circuits of the row to supply a first reset control signal; a second reset control line of each row is connected with second reset circuits in pixel circuits to supply a second reset control signal; a first light emission control line of each row is connected with first light emitting circuits in pixel circuits of the row to supply a first light emission control signal; and a second light emission control line of each row is connected with second light emitting circuits in pixel circuits to supply a second light emission control signal.

It should be noted that the display apparatus shown in FIG. 9 may further include a plurality of first voltage lines, a plurality of second voltage lines, and a plurality of reset voltage lines (or a plurality of first reset voltage lines and a plurality of second reset voltage lines) to respectively supply the first power voltage VDD, the second power voltage VSS, and the reset voltage Vinit (which may include the first reset voltage Vint1 and the second reset voltage Vinit2) (not shown in the diagram).

Optionally, as shown in FIG. 9, the display apparatus 1 may further include a scan driving circuit 20 and a data driving circuit 30.

For example, the data driving circuit 30 may be connected with the plurality of data lines ($D_M$, $D_{M+1}$, etc.) to supply data signals Vdata, and at a same time, may also be connected with a plurality of first voltage lines (not shown in the diagram) and a plurality of reset voltage lines (not shown in the diagram), etc. to respectively supply respective voltages.

For example, the scan driving circuit 20 may be connected with respective control lines that need to be shifted, for example, be connected with the plurality of writing control lines (SN. SN+1, etc.), to supply the writing control signals, and at a same time, may also be connected with the plurality of compensation control lines to supply the compensation control signals, be connected with the plurality of (first and second) light emission control lines ($E_{N1}$, $E_{N1+1}$, $E_{N1}$, $E_{N1+1}$, etc.) to supply the (first and second) light emission control signals, and be connected with the plurality of (first and second) reset control lines to supply the reset control signals, etc.

For example, the scan driving circuit 20 and the data driving circuit 30 may be implemented as a semiconductor chip. The display apparatus may further include other components, for example, a timing controller, a signal decoding circuit, and a voltage converting circuit, etc.; these components may, for example, be existing conventional components, and no details will be repeated here.

For example, the display apparatus provided by this embodiment may be an electronic paper, a mobile phone, a tablet personal computer, a television, a monitor, a laptop, a digital photo frame, a navigator, and any other product or component having a display function.

The above are only specific embodiments of the present disclosure, but the scope of the embodiment of the present disclosure is not limited thereto, and the scope of the present disclosure should be the scope of the following claims.

The invention claimed is:

1. A pixel circuit, comprising: a driving circuit, a data writing circuit, a compensation circuit, a light emission control circuit, a first reset circuit, a second reset circuit, and a light-emitting element; wherein:

the driving circuit comprises a control terminal, a first terminal and a second terminal, which are respectively connected with a first node, a second node, and a third node, and are used for controlling a driving current flowing through the first terminal and the second terminal for driving the light-emitting element to emit light;

the data writing circuit is used for writing a data signal to the first terminal of the driving circuit under control of a writing control signal;

the compensation circuit is used for electrically connecting the control terminal and the second terminal of the driving circuit under control of a compensation control signal, and storing a voltage of the control terminal of the driving circuit;

the light emission control circuit is used for causing the driving current to flow through the light-emitting element under control of a light emission control signal;

the first reset circuit is used for applying a first reset voltage to the control terminal of the driving circuit under control of a first reset control signal, the second reset circuit is used for applying a second reset voltage to a first electrode of the light-emitting element under control of a second reset control signal;

in a case where each display cycle sequentially comprises one write frame and at least one skip frame, within the write frame, the writing control signal and the second reset control signal are synchronized, and within each skip frame, the writing control signal is kept as an invalid level, and the second reset control signal of the skip frame has same characteristics as the second reset control signal of the write frame.

2. The pixel circuit according to claim 1, wherein, the light emission control signal comprises a first light emission control signal and a second light emission control signal, and the light emission control circuit comprises:

a first light emission control circuit, used for applying a first power voltage to the first terminal of the driving circuit under control of the first light emission control signal;

a second light emission control circuit, used for applying the driving current from the second terminal of the driving circuit to the first electrode of the light-emitting element serving as a fourth node under control of the second light emission control signal, with respect to each display cycle, within the write frame and each skip frame, the first light emission control signal and the second light emission control signal are synchronized; or for each display cycle, within the write frame, the first light emission control signal and the second light emission control signal are synchronized, and within each skip frame, the first light emission control signal is kept as a valid level, and the second light emission control signal of the skip frame has same characteristics as the second light emission control signal of the write frame.

3. The pixel circuit according to claim 2, wherein, the driving circuit comprises a first transistor, a gate electrode of the first transistor serves as the control terminal of the driving circuit and is connected with the first node, a first electrode of the first transistor serves as the first terminal of the driving circuit and is connected with the second node, and a second electrode of the first transistor serves as the second terminal of the driving circuit and is connected with the third node.

4. The pixel circuit according to claim 2, wherein, the data writing circuit comprises a second transistor, a gate electrode of the second transistor is used for receiving the writing control signal, a first electrode of the second transistor is used for receiving the data signal, and a second electrode of the second transistor is connected with the second node.

5. The pixel circuit according to claim 2, wherein, the compensation circuit comprises a third transistor and a storage capacitor, a gate electrode of the third transistor is used for receiving the compensation control signal, a first electrode of the third transistor is connected with the third node, a second electrode of the third transistor is connected with a first electrode of the storage capacitor and the first node, and a second electrode of the storage capacitor is used for receiving the first power voltage.

6. The pixel circuit according to claim 5, wherein, the first reset circuit comprises a sixth transistor, a gate electrode of the sixth transistor is used for receiving the first reset control signal, a first electrode of the sixth transistor is connected with the first node, and a second electrode of the sixth transistor is used for receiving the first reset voltage.

7. The pixel circuit according to claim 6, wherein, the second reset circuit comprises a seventh transistor, a gate electrode of the seventh transistor is used for receiving the second reset control signal, a first electrode of the seventh transistor is connected with the first electrode of the light-emitting element, and a second electrode of the seventh transistor is used for receiving the second reset voltage.

8. The pixel circuit according to claim 7, wherein, leakage current characteristics of at least one of the transistors whose first electrode or second electrode is directly connected with the storage capacitor are superior to leakage current characteristics of other transistors in the pixel circuit.

9. The pixel circuit according to claim 5, wherein, the first reset circuit comprises a sixth transistor, a gate electrode of the sixth transistor is used for receiving the first reset control signal, a first electrode of the sixth transistor is connected with the third node, and a second electrode of the sixth transistor is used for receiving the first reset voltage.

10. The pixel circuit according to claim 2, wherein, the compensation circuit comprises a third transistor, an additional transistor, and a storage capacitor, a gate electrode of the third transistor is used for receiving the writing control signal, a first electrode of the third transistor is connected with the third node, a second electrode of the third transistor is connected with a fifth node, and the third transistor connects the third node and the fifth node under control of the writing control signal;

a gate electrode of the additional transistor is used for receiving the compensation control signal, a first electrode of the additional transistor is connected with the fifth node, a second electrode of the additional transistor is connected with the first electrode of the storage capacitor and the first node, a second electrode of the storage capacitor is used for receiving the first power voltage, and the additional transistor connects the fifth node and the first node under control of the compensation control signal.

11. The pixel circuit according to claim 10, wherein, the first reset circuit comprises a sixth transistor, a gate electrode of the sixth transistor is used for receiving the first reset control signal, a first electrode of the sixth transistor is connected with the fifth node, and a second electrode of the sixth transistor is used for receiving the first reset voltage.

12. The pixel circuit according to claim 2, wherein, the first light emission control circuit comprises a fourth transistor, a gate electrode of the fourth transistor is used for receiving the first light emission control signal, a first electrode of the fourth transistor is used for receiving the first power voltage, and a second electrode of the fourth transistor is connected with the second node;

the second light emission control circuit comprises a fifth transistor, a gate electrode of the fifth transistor is used for receiving the second light emission control signal, a first electrode of the fifth transistor is connected with the third node, a second electrode of the fifth transistor is connected with the first electrode of the light-emitting element, and the second electrode of the light-emitting element is used for receiving the second power voltage.

13. A display apparatus, comprising a plurality of pixel units arranged in an array, wherein, each of the pixel units comprises the pixel circuit according to claim 1.

14. A driving method for the pixel circuit according to claim 1, comprising: in a case where each display cycle sequentially comprises one write frame and at least one skip frame, within the write frame, synchronizing the writing control signal and the second reset control signal, including in the write frame: a reset stage, a data writing and compensation stage, and a light emission stage; and within each skip frame, keeping the writing control signal as an invalid level, making the second reset control signal of the skip frame have same characteristics as the second reset control signal of the write frame, and including in the skip frame: a light emission reset stage corresponding to the data writing and compensation stage of the write frame and a light emission stage corresponding to the light emission stage within the write frame.

15. The driving method according to claim 14, wherein, the light emission control signal comprises a first light emission control signal and a second light emission control signal, and the driving method further comprises:

within the write frame, synchronizing the first light emission control signal and the second light emission control signal; and within each skip frame, keeping the first light emission control signal as a valid level, and making the second light emission control signal of the skip frame have same characteristics as the second light emission control signal of the write frame.

* * * * *